United States Patent [19]

Roper et al.

[11] Patent Number: 4,836,616
[45] Date of Patent: Jun. 6, 1989

[54] ANTILOCK BRAKE SYSTEM

[75] Inventors: Daniel W. Roper, Rochester; Dennis A. Kramer, Troy; Mark E. Malinowski, Farmington Hills; John Dombrowski, Redford, all of Mich.

[73] Assignee: Rockwell International Corporation, Pittsburgh, Pa.

[21] Appl. No.: 216,918

[22] Filed: Jul. 7, 1988

Related U.S. Application Data

[62] Division of Ser. No. 824,750, Jan. 31, 1986, abandoned.
[51] Int. Cl.$^4$ .............................................. B60T 8/88
[52] U.S. Cl. ................... 303/92; 188/181 R; 188/181 C; 303/7; 303/20; 303/96; 303/100; 303/105; 303/109
[58] Field of Search ............... 303/96, 99, 109, 100, 303/105, 20, 92, 91, 7; 188/181 AK; 310/168; 364/426; 307/440, 442; 73/121

[56] References Cited

U.S. PATENT DOCUMENTS

| | | | |
|---|---|---|---|
| 3,620,577 | 11/1971 | Neisch et al. | 303/92 X |
| 3,804,470 | 4/1974 | Slavin et al. | 303/109 |
| 3,883,197 | 5/1975 | Carp et al. | 303/109 |
| 3,912,340 | 10/1975 | Bertolasi | 303/109 |
| 3,934,685 | 1/1976 | Jovick | 188/181 R |
| 3,934,938 | 1/1976 | Kuwana et al. | 303/109 |
| 3,949,841 | 4/1976 | Jovick et al. | 188/181 R |
| 3,966,267 | 6/1976 | McNinch et al. | 303/106 |
| 3,980,349 | 9/1976 | Cook | 303/20 |
| 4,027,926 | 6/1977 | Arai et al. | 303/109 |

Primary Examiner—Douglas C. Butler

[57] ABSTRACT

A antilock brake system utilizes a microprocessor controller to monitor the rate of speed decay of a braked wheel of a vehicle and to cause release of braking force under incipient wheel lock-up conditions. The microprocessor receives a single digital wheel speed input signal and processes the latter in accordance with a program whereby a reference signal is generated and is periodically compared with the wheel speed signal to determine if a lock-up condition is in progress. The microprocessor compares the speed signal with the reference signal at frequent sampling intervals and when the wheel speed decreases at a rate exceeding a desired value, the reference signal is varied by the microprocessor to decrease at a predetermined first rate of decrement until the wheel speed signal and the reference signal correspond to each other, indicating that the wheel speed is dropping at a rate in excess of a desired rate of speed decay. The microprocessor adjusts the rate of decrement of the reference signal at a second maximum rate and generates a brake release signal to relieve the brake force applied to the wheel. When the wheel speed signal again crosses over the reference signal, the brake force is restored and the reference signal again tracks the wheel speed signal at a value less than the wheel speed signal. The microprocessor determines whether the weel is on a high or low friction surface and compensates for the latter by extending the brake release signal to provide additional time for the wheel to regain velocity. The microprocessor controller restricts the maximum time of brake release signal generation during each brake release cycle. The wheel speed sensing system and microprocessor controller are located remote from the braked wheel and in close proximity to each other to minimize the effects of shock, vibration and electrical interference. A failsafe circuit arrangement is also disclosed as part of the microprocessor controller.

24 Claims, 8 Drawing Sheets

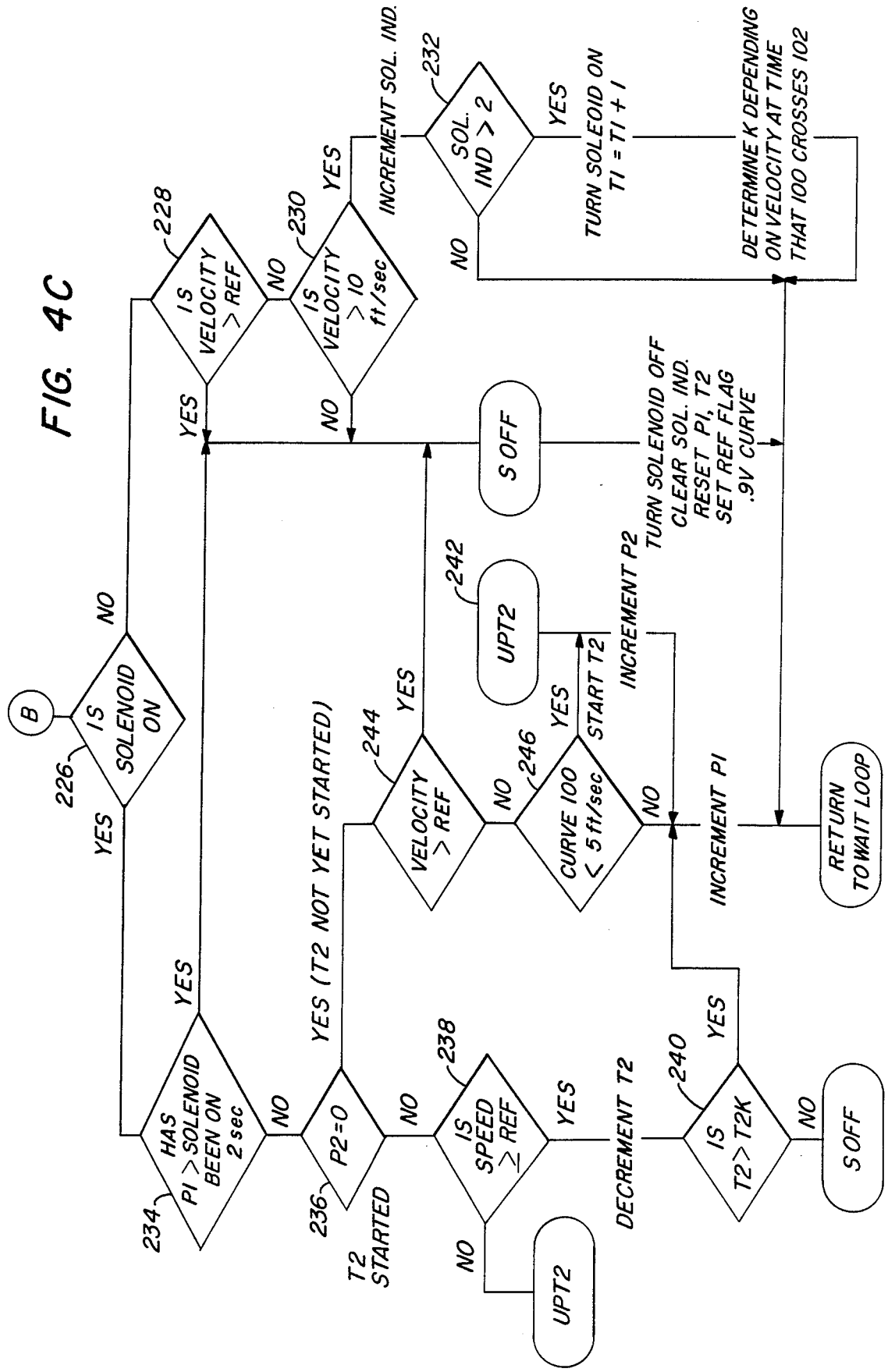

ANTILOCK BRAKE SYSTEM

This application is a division, of application Ser. No. 06/824,750, filed Jan. 31, 1986, now abandoned.

FIELD OF THE INVENTION

This invention relates to a method and apparatus for reliably preventing a brake system from locking a wheel or wheel set of a vehicle so as to maintain limited rolling motion of the wheel or wheels and maximize directional controlled deceleration of the vehicle on surfaces having varying frictional characteristics.

BACKGROUND OF THE INVENTION

Antiskid brake systems enhance the ability of a vehicle to safely stop on a surface having an unexpected low coefficient of friction. Known systems monitor variations in the rotational speed of at least one wheel of a vehicle relative to the speed of the vehicle to detect a rapid reduction in the speed of the wheel that typically indicates that the brake is forcing the wheel to lock. An antilock system maximizes the frictional force between the wheel and the road surface by generating a control signal that reduces the force that the brake applies to the wheel, thus permitting the wheel to continue to reduce the velocity of the vehicle by allowing limited wheel rotation at a speed less than that corresponding to the velocity of the vehicle.

Other antilock systems that use velocity logic also compare a sensed speed voltage signal proportional to the rotational speed of a braked wheel to a predetermined variable reference voltage signal having a value that is less than that of the wheel speed voltage signal. Normally the established rate of decrease of the reference voltage with respect to time (reference voltage curve) is limited to a maximum rate corresponding to a predetermined rate of decay. If the actual speed of the wheel decreases at a greater rate than the maximum permitted rate of deceleration, the wheel speed voltage signal becomes less than the reference voltage signal and a control circuit, which detects the change in relative values between the wheel speed voltage and reference voltage signals, generates a command to decrease the force that the brake applies to the wheel.

Antilock systems typically must contain means for canceling the antilock signal that relieves brake force to permit restoration of full braking force to the wheel when the speed of the wheel begins to increase again after the brake is released. One canceling method is to calculate a second reference voltage that is greater than a wheel speed signal that corresponds to the velocity of the vehicle. The rate of increase of the wheel speed signal is then limited to a finite rate of increase corresponding to a predetermined rate of speed increase of the wheel. Care must be exercised in reapplying the brake force, however, because the proper amount of force to apply is determined by the instantaneous frictional force between the wheel and the road surface over which the wheel is moving. The amount of friction between the wheel and road can vary greatly; therefore, an antilock system often has means to adapt the amount of braking force applied to the wheel to the traction conditions between the wheel and surface.

Other systems contain examples of failsafe systems for disabling the antilock system and returning full control of the brake to the operator of the vehicle. The antilock system might have to be disabled if, for example, the system failed while releasing the braking force. These systems typically prevent the brake release system from operating when a failure is sensed, thereby returning control over the application of braking force to the operator of the vehicle. Indicator means inform the operator of the vehicle of a problem in the antilock system. The ultimate objective of any failsafe system is to leave the operator of the vehicle in no worse a position during a system failure than if the system had never been incorporated in the vehicle braking system.

Some systems compare the wheel speed signal with the reference signal by means of complex analog electronics. These analog means, however, are susceptible to temperature, environmental and electromagnetic interference. Control over the application of braking force, as well as control over the failsafe systems, is typically produced by complex analog computation systems that are susceptible to similar interference. The susceptibility of the control components to temperature interference requires use of various compensation means and the importance of having precise values for the components of the resulting circuit requires using expensive precision circuit components. These other systems show little, if any, concern with the harmful effects of stray voltages and radio frequency interference on the performance of the antilock system.

The disadvantages associated with analog controllers has motivated some to use a digital controller. The advantages of digital control are most fully realized by using a microprocessor to process a control algorithm. These advantages include the ability to more rapidly respond to actual conditions by using interrupt driven systems algorithms and greater accuracy in controlling the ultimate releasing and reapplying of the braking force. An antilock controller using a microprocessor to perform the necessary signal processing and control computations should make the antilock system less expensive to produce because a relatively inexpensive microprocessor may replace expensive analog circuitry.

An antilock system that uses using a microprocessor to execute various algorithms, however, requires a failsafe system that recognizes and responds to a greater number of potential system failures because the antilock system is more complex. The complexities involved in producing safe microprocessor controlled antilock systems has apparently slowed their use in mass produced vehicles. Moreover, the accuracy and response time of an antilock system is limited by various factors, such as mechanical oscillations of the vehicle and the runout (or eccentricity) of the wheel axle of the vehicle which adversely affect the accuracy of measurements the wheel speed, and electromagnetic interference which adversely effects the ability of a digital control system to correctly process the measured wheel speed signal.

Many of these considerations have not heretofore been solved, or even recognized, in the prior art.

SUMMARY OF THE INVENTION

It is an aspect of the present invention to provide for a method and apparatus for accurately measuring and processing a wheel speed signal and for reliably and safely generating a brake force release signal.

It is another aspect of the present invention to control the amount of braking force applied to the wheel of the vehicle to maximize the amount of friction between the road and wheel and to minimize the distance required for the vehicle to stop.

It is another aspect of the present invention to provide a microprocessor controlled antilock system that measures braking conditions and that quickly and accurately determines an appropriate response.

It is another aspect of the present invention to provide a failsafe circuit arrangement that disables the antilock system if it malfunctions so that the the antilock system never reduces the control which the operator has over the vehicle.

It is another aspect of the present invention to provide a digitally controlled antilock system to control a pneumatically actuated brake.

It is another aspect of the present invention to provide an digitally controlled antilock system that uses velocity logic.

It is another aspect of the present invention to provide an antilock system that uses only one speed sensor to control the release of braking force in a skid situation.

It is another aspect of the present invention to provide an antilock system to release braking force that uses only one speed sensor to measure the average speed of two wheels on a single axle or the average speed of all wheels on a drive axle.

It is another aspect of the present invention to provide a method for digital signal processing that obtains high accuracy for controlling the antilock system while using a minimal amount of signal processing hardware.

It is another aspect of the present invention to minimize adverse environmental influences on a digitally controlled antilock system.

It is another aspect of the present invention to provide a method for an anilock system to control the release of braking force that requires a microprocessor having only minimal capability.

It is another aspect of the present invention to provide a method for an antilock system that compensates for unexpectedly low traction between the wheel and the road.

It is another aspect of the present invention to provide a means and method for regulating the power supplied to an antilock system to prevent the system from experiencing a thermally induced failure.

These and other aspects are obtained with the antilock system of the present invention by mounting a microprocessor in close proximity to a wheel speed sensor so as to minimize the length of sensor leads and, hence, the susceptibility of the antilock controller to electromagnetic interference. Further, the controller is mounted on the carrier of a drive axle to preferably measure the average rate of rotation of the wheels of the vehicle. Positioning the wheel speed sensor on the carrier reduces the amount of radial runout and mechanical oscillations detected by the sensor and thus improves the accuracy of the wheel speed measurement. Surprisingly, the accuracy of the control of the vehicle is not severely reduced by measuring only an average wheel speed. Moreover, the time required for the antilock controller to respond to a change in the actual wheel speed and generate a brake force release command is reduced to as little as 20 milliseconds, and possibly less. The antilock controller may be made integral with the axle so that the vehicle may be supplied with a pretested antilock control system that preferably does not require testing during the assembly or operational lifetime of the vehicle.

A microprocessor controller receives a digitalized input wheel speed signal from a speed sensor that is indicative of rate of a rate of rotation of at least one wheel of the vehicle. The microprocessor executes a control algorithm and a systems algorithm. The control algorithm determines a reference signal that, so long as the wheel is not apt to lock, varies so as to correspond to a predetermined fraction less than unity of the input wheel speed signal.

The microprocessor frequently compares the speed signal with the reference signal. If the control algorithm determines that the input wheel speed signal is decrementing at a rate exceeding a predetermined first rate of speed decrement, the control algorithm decrements the reference signal at the first maximum rate. If the wheel speed input signal decrements at a rate exceeding the first maximum rate of reference signal decrement, the value of the speed signal must at some point correspond to, and become less than, the value of the reference signal. If the reference signal ever corresponds to the speed signal, the microprocessor assumes that the high rate of speed decrement is caused by application of braking force to the wheels of the vehicle and that the wheels are about to lock. The microprocessor acts to prevent the wheels from locking by generating a brake force release signal for a period of time up to a predetermined maximum time stored in the memory of the microprocessor.

At approximately the same time the microprocessor generates the brake force release signal, the control algorithm begins to decrement the reference signal at a second, greater rate corresponding to a second maximum rate of reference signal decrement to compensate for various mechanical delays present in eventually reapplying the braking force. The control algorithm decrements the reference signal at the second maximum rate until the value of the reference signal again corresponds to, or becomes less than, the value of the wheel speed signal. The wheel speed signal and reference signal correspond a second time because the speed of the wheel increases during the release of the braking force which causes the value of the wheel speed signal to increase while the value of the reference signal continues to decrease at the second maximum rate of decrement. Once the microprocessor detects that the value of the wheel speed signal at least corresponds to the value of the reference signal, the microprocessor discontinues the release of the braking force and the brake again applies the full measure of braking force requested by the operator. The control algorithm executed by the microprocessor resumes the original relationship between the speed signal and the reference signal once the speed signal exceeds the value of the reference signal by a predetermined fractional value, such as 0.1 of the value of the reference signal, so that the reference signal again equals the predetermined fraction less than unity of the value of the speed signal.

If the wheel speed signal again decrements at a excessive rate greater than the first maximum rate of speed decrement, the control algorithm again decrements the reference signal at the first maximum rate of reference signal decrement and the entire process discussed above repeats. Typically the antilock system engages several brake release cycles before the vehicle comes to a stop.

The microprocessor executes the control algorithm in response to a control interrupt generated by a clock. The systems algorithm updates the value of the wheel speed signal independently of the execution of the control algorithm in response to a sensor interrupt generated by the input wheel speed signal. The control algorithm quickly determines all control values (approximately every 10 milliseconds) using the last value for the wheel speed signal supplied by the systems algorithm prior to beginning the iteration. The microprocessor does not, however, generate the brake force release signal until the control algorithm indicates that the value of the reference signal exceeds the value of the wheel speed signal for two or more successive iterations of the control algorithm. The delay in generating the brake force release signal compensates for possible inaccuracies in the input wheel speed signal produced by, for example, radio frequency interference, axial runout or transient mechanical vibrations. The systems algorithm contained in the microprocessor does not update the wheel speed signal used by the control algorithm until receipt of a sensor input pulse generated by the input speed sensor. Once the systems algorithm updates the wheel speed information, however, the control algorithm delays servicing the next sensor interrupt pulse to prevent any possible collision of an update of the wheel speed signal by the systems algorithm with an attempt by the control algorithm to extract a value for the most recent wheel speed signal.

The antilock control system in accordance with the present invention determines the frictional characteristics of the road from only the input wheel speed signal. The microprocessor detects various time periods required for the value of the wheel speed signal to again correspond to the value of the reference signal. If the time period required exceeds a predetermined time constant stored in the microprocessor, the reapplication of brake force is delayed by the control algorithm for a predetermined length of time to compensate for the poor traction of the low friction surface. The time constant is a function of the value of the wheel speed signal when it first decrements below the value of the reference signal.

The invention further contemplates an antilock brake system for a vehicle in which all of the antilock control functions are performed by a microprocessor programmed to process a digitized input wheel speed signal without directly sensing vehicle velocity or other external conditions. The control algorithm generates the reference signal and control signals based on the wheel speed signal generated from the input wheel speed signal. The microprocessor is preprogramed with values for the reference signal corresponding to various increments of speed range in accordance with experimentally derived values for the type of vehicle using the antilock system. Accordingly, the present invention achieves greater simplicity by eliminating the need for analog signal processing while also permitting the antilock system to effectively operate in real time.

Further reliability and efficiency of the system is achieved by physically locating the wheel speed sensor and microprocessor closely adjacent each other at a point remote from the wheel where the average wheel speed can be accurately sensed. For example, both the sensor and the microprocessor controller can be located adjacent a drive shaft for the braked wheel at a point remote from the wheel where shock and vibration loads are minimized. Positioning the sensor and microprocessor in close proximity to one another also reduces the effects of transient, electromagnetically induced voltage pulses. An important aspect of the positioning of the sensor and microprocessor next to an axle is in reducing the effect of environmental influences, radial runout, and especially axial runout.

The present invention further contemplates a failsafe system that inactivates the antilock system under certain predetermined conditions related to vehicle speed control, logic or hardware failure. The control algorithm is programed to terminate the brake force release command if the command has been activated for too long a period of time, such as 2.5 seconds. Also, the circuit arrangement for directing the brake force release commands to the brake force release means will terminate the commands and disable the antilock unit if the microprocessor, contrary to proper operation, has issued the brake force release command a longer period of time such as four seconds. Finally, the microprocessor and circuit arrangement cooperate to test whether the wheel speed sensor, sensor input circuit and brake force release means are operable and to disable the antilock system if they are not.

DESCRIPTION OF THE DRAWINGS

With respect to the appended drawings,

FIGS. 4a, 4b and 4c comprise a flow chart of the program stored in the microprocessor used in the present invention to generate brake release signals in accordance with detected wheel lock-up conditions;

DETAILED DESCRIPTION OF THE PREFERRED EMBODIMENT

Figure 1:
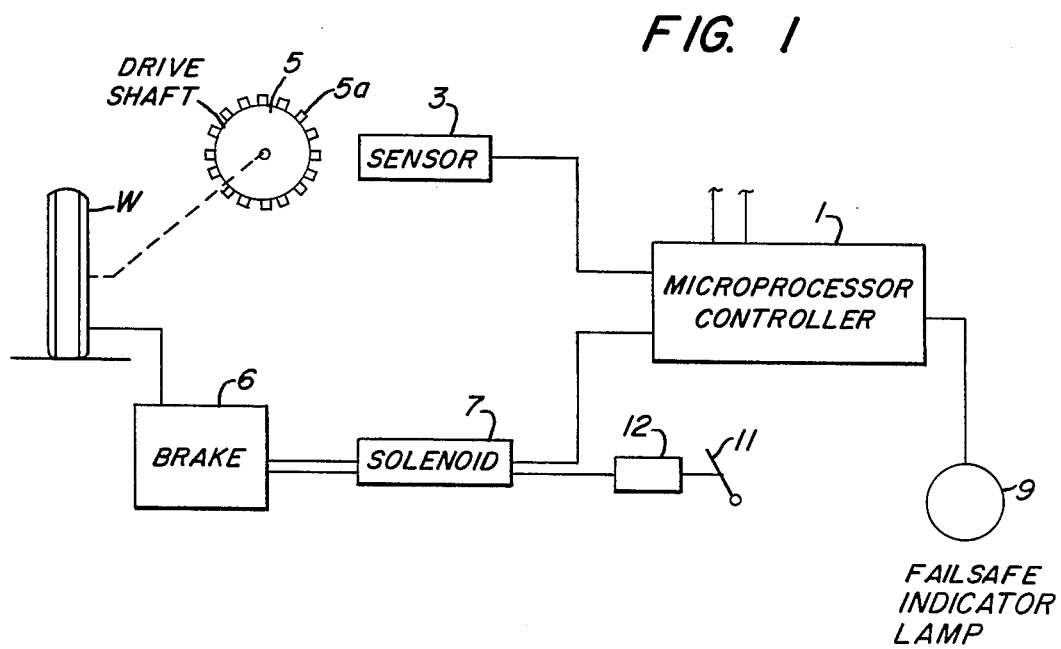
FIG. 1 schematically illustrates the antilock wheel rake control system in accordance with the present invention.

With reference to FIG. 1, an antilock brake control system for a vehicle wheel W includes a microprocessor controller 1, a wheel speed sensor 3 for generating a input wheel speed signal supplied to the microprocessor 1 via appropriate electrical leads, a brake for the wheel and an electrically actuated brake force release device 7, preferably in the form of a solenoid for relieving fluid brake pressure to brake 6. The braking system, of course, includes an operator controlled brake applying element such as a pedal 11 and an appropriate control valve or master cylinder 12 for converting motion of pedal 11 into brake force at brake 6. A failsafe indicator lamp 9 is furthermore provided at a point in the system visible to a vehicle operator and is controlled by the microprocessor 1.

LOCATION OF THE SYSTEM

Figure 2:
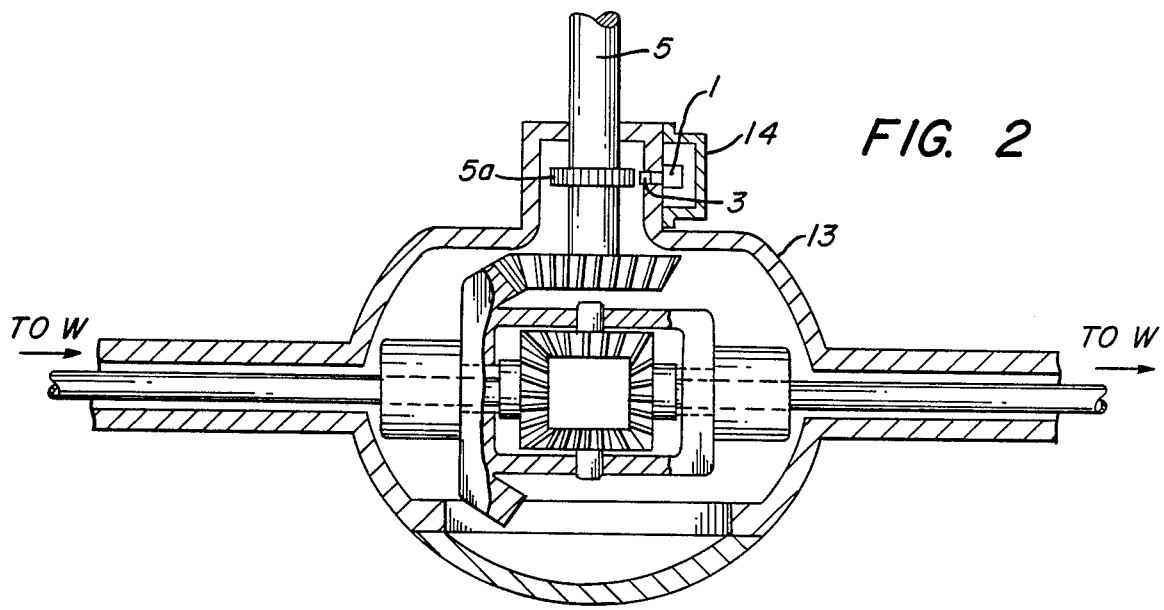
FIG. 2 schematically illustrates the wheel speed sensor portion of the present invention installed with the microprocessor controller adjacent a drive shaft of a braked wheel.

As shown in FIG. 2, the speed sensor 3 is preferably located adjacent an input drive shaft 5 for the wheels of the vehicle which is connected directly or through appropriate gearing to the braked wheel W in such a manner that the rotational speed of the shaft 5 is directly correlated to the average speed of however many wheels are sensed. Drive shaft 5 includes regularly spaced magnetic elements such as teeth 5a that move past a magnetic reluctance speed sensor 3 which contains means for detecting the periodic motion of the magnetic elements past the sensor as is well known to one skilled in the art. As shown in FIG. 2, both the sensor 3 and the microprocessor 1 are preferably mounted on the carrier housing 13 of the drive shaft system for the braked wheel W. Such mounting is located remote from the wheel itself in a typical installation, where it is relatively isolated from road shock and a broad range of vibration frequencies typically found at the wheel W. The sensor 3 and microprocessor 1 are disposed within a shielded metal housing 14 for protection against environmental hazards as well as radio frequency interference. Short lead wires can therefore be used between the sensor 3 and the microprocessor 1 to further minimize radio frequency interference.

The aforementioned positioning of the antilock system substantially removes the system from the most common environmental hazards, such as dirt, salt deposits, etc., thrown up by the wheels of the vehicle, and other maintenance operations typically performed on the wheels of a vehicle during its operational lifetime. Moreover, the preferred positioning of the sensor further reduces the effects of radial runout and especially axial runout. Radial and axial runout is typically greatest at the wheel and less at the axle. We have found that the amount of radial and axial runout present at the wheels of the vehicle needlessly reduces the accuracy of the digital processing system contemplated by the present invention and that placing the sensor on an axle of the vehicle enables the sensor to supply a more reliable signal to the microprocessor control.

The preferred embodiment of the present invention places the brake force release means near the axle in close proximity to the brake. We have found that the primary delay in controlling the release of braking force comes from mechanical delays present in transferring a brake release signal from the brake release means to the brake. While the control algorithm of the antilock controller may compensate for the magnitude of the mechanical delay by anticipating future conditions to the extent necessary to ensure that the brake release signal reaches the brake at the correct time, the present invention can obtain a more precise control over the antilock cycle by minimizing the inherent mechanical delays to the greatest extent possible. The magnitude of the mechanical delay is particularly great for pneumatically actuated brakes that are typically used on 18-wheel tractor-trailer rigs and other trucks.

It will be understood that the sensor system in accordance with the present invention could be located at any location at which an input wheel speed signal can be precisely obtained and that the microprocessor likewise could be located at a point more remote from the sensor. However, it is considered to be an important feature of the present invention that the sensor 3 and microprocessor 1 are disposed closely adjacent each other in a shielded environment remote from the braked wheel for the reasons set forth above.

CONTROL LOGIC

Figure 3A:
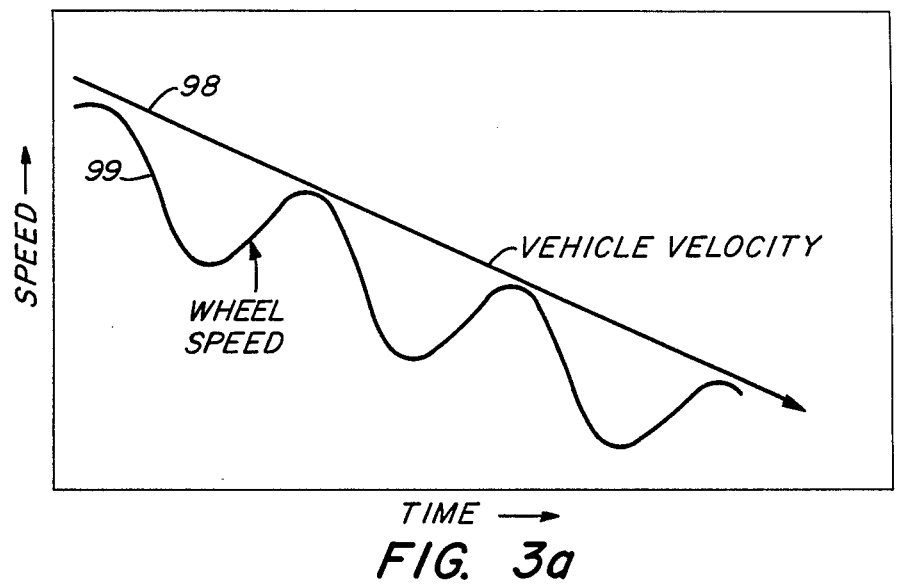
FIGS. 3a and 3b respectively illustrate representative wheel speed signal curves intended to diagrammatically illustrate the principle of operation of the present invention.

With reference to FIG. 3a, an ideal plot of vehicle velocity versus time is shown as curve 98, indicating a linear speed decay of the vehicle upon application of maximum brake force to the vehicle wheels. Curve 99 indicates ideal wheel speed signal versus time using a typical antilock system. In the antilock system of the present invention, application and release, or modulation, of brake force causes periodic decrement and increment of wheel speed signal, respectively. The antilock system attempts to modulate the braking force so that the wheel always rotates at a speed less than a speed corresponding to the speed of the vehicle, thus ensuring that the brakes always apply at least some braking force to the wheels. The present invention may not be able to obtain this ideal in all instances, such as the first time that a pneumatic brake locks. However, even in extreme cases, the antilock system of the present invention can attempt to optimize the modulation of the braking force so as to control the variation in the actual speed of the wheel between the two extremes and maximize the frictional force which the wheels exert against the road. Various formulae are known in the art are available to those skilled in the art providing a correlation between maximum speed of wheel rotation and vehicle velocity to achieve minimum stopping distances for the vehicle. The present invention assumes for simplicity that the decay in the velocity of the vehicle is linear within the range of operation of the antilock system.

Figure 3B:
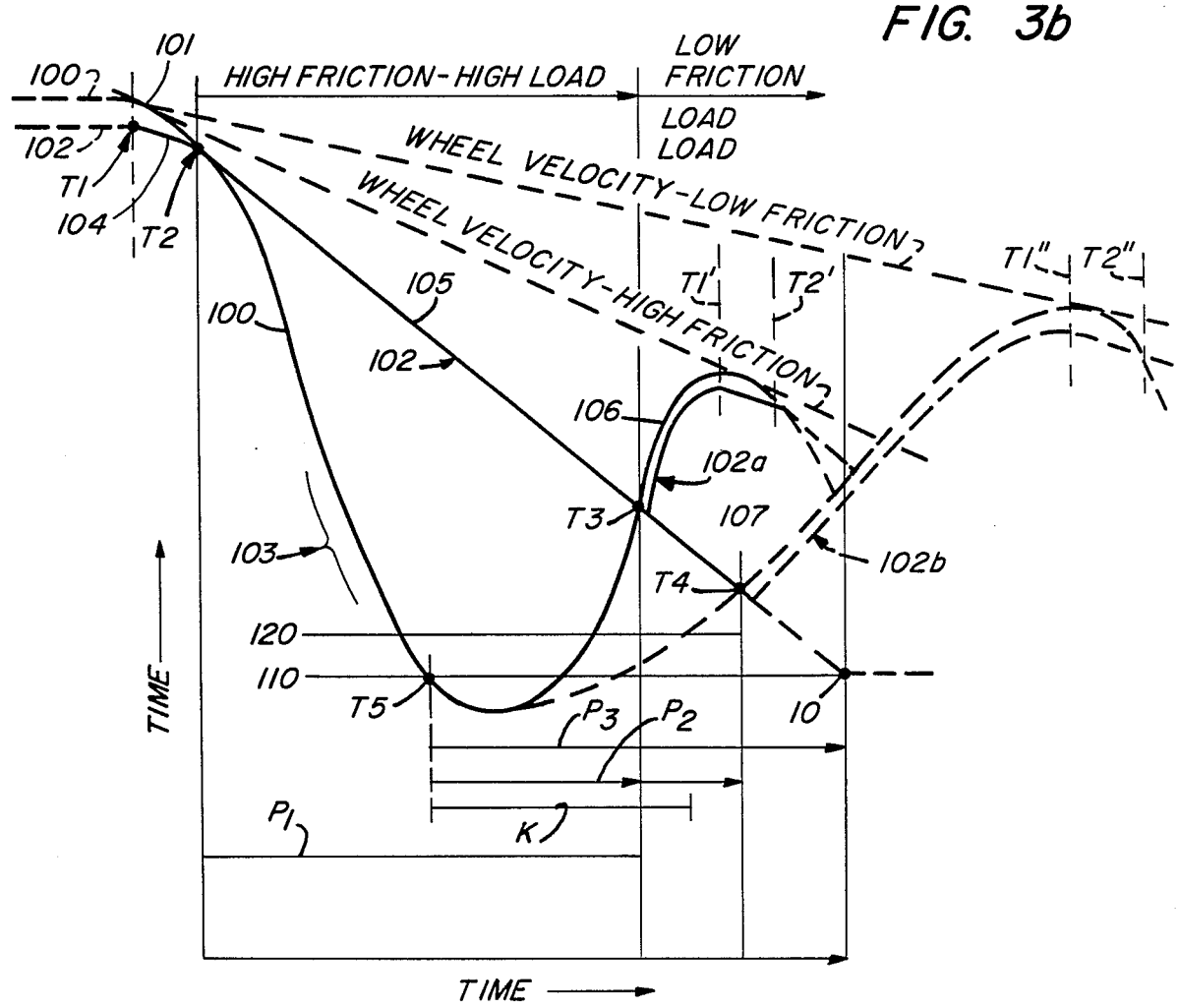

Referring now to FIG. 3b, a series of curves is shown to illustrate the operational principle of the present invention. The vertical axis corresponds to the value of a digitized input wheel speed signal, while the horizontal axis corresponds to a time interval corresponding to the occurrence of the digitized speed signal. Curve 100 represents the plot of actual values of a digital speed input signal corresponding to the rotational speed of a braked wheel W under conditions of incipient wheel lock-up due to the inability of the contact surface engaging the wheel to resist frictional sliding motion of the wheel. It will be observed that, to the left of time T1, the wheel speed signal is a constant or is decreasing at a permissible rate of decrement. However, upon the application of braking force to the wheel exceeding that which the wheel can sustain for the surface over which it is moving, the speed of the wheel begins to decrement at an increasing rate as shown at 101. Assuming that a lock-up condition is about to occur, the wheel speed signal rapidly decays at a very steep rate of decrement as shown along portion 103 of curve 100.

In accordance with the present invention, digitized input wheel signals 100 are supplied as inputs to microprocessor controller 1 where they are periodically sampled at a frequent rate to detect their values and the rate of change of same. Within the microprocessor, a digitized reference signal 102 is generated that corresponds to a predetermined fraction less than unity of the input speed signal 100. The reference signal 102 is constantly generated during the input of speed signal 100 and is appropriately adjusted in value as the speed signal varies.

If wheel speed signal 100 decrements too rapidly, the wheel speed signal exceeds a predetermined permitted rate of speed decrement as shown at 101 of curve 100. Beginning at time T1, the microprocessor, which is constantly sampling the-speed signal 100, adjusts the value of the reference signal 102 so that it begins to decrement at a constant first maximum rate of decrement as shown at 104. The first maximum rate of decrement of he reference signal 102 corresponds to a predetermined rate of deceleration that has been selected in accordance with this invention to correspond to a speed deceleration rate of approximately 0.7 g or 22.4 ft/sec$^2$ (where g represents the acceleration of gravity).

If the rate of decrement of the wheel signal continues to exceed the first maximum rate of reference signal decrement 104, it will eventually correspond with and drop below the value of the reference signal at time T2. The microprocessor, continuously comparing the values of the speed and reference signals, detects this occurrence at time T2 and determines at this point that incipient lock-up of the wheel W is in progress. After two iterations indicating the crossover, the microprocessor controller generates a brake release signal to solenoid 7 to cause release of brake force tending to cause the lock-up condition.

At time T2, the microprocessor further-adjusts the reference signal 102 to decrement at a second, greater, maximum rate of reference signal decrement as shown at 105 on curve 102. The steeper rate of decrement corresponds to a maximum deceleration rate of, for example 1.0 g (32 ft/sec$^2$). This decrement rate may be thought of as a fictitious approximation of the deceleration of the vehicle during a skid situation. Presuming a greater rate of vehicle deceleration in a skid situation is obviously not a realistic assumption. However, the brakes of the vehicle do not respond immediately to the commands of the antilock system. Thus, the antilock control system must anticipate future conditions to the extent necessary for the brake force control commands to reach the brake at an appropriate time. The greater rate of signal decrement may be thought of as produced by dividing the anticipated speed of the vehicle during the skid cycle by a time period corresponding to the actual time that the vehicle is in the skid cycle less a period of time corresponding to the combined time required for the brake release command to travel from the solenoid valve to the brake and the delay times inherent in operating the solenoid valve and brake.

It is to be appreciated that the present invention differs from other systems that use a greater rate of reference signal decrement to compensate for delays produced in computing the control functions for their antilock system. The present invention uses the fictitious rate of decrement to compensate only for the mechanical delays of the system, primarily the delay time required for the brake system to respond to the antilock control signals, and not for the time required for the antilock system to compute the control commands. Also, the magnitude of the second rate of reference speed decrement illustrated results from the present invention being applied to a pneumatic brake system. Pneumatic brake systems require a longer period of time to respond to the brake release and reapply commands because of the greater period of time required for a pressure wave to travel through the compressible fluid present in a pneumatic brake line. The second rate of decrement of the signal would be less, i.e. closer to the actual deceleration of the vehicle, if the pneumatic brake system were replaced with an hydraulic brake system because the commands to the brake can travel faster through the noncompressible fluid present in an hydraulic line. The response of the vehicle also may depend on the type of brake force release means and the type of brake used in the vehicle. Thus, the rate of decrement of curve 102 is selected in accordance with the type of brake system and, to a lesser extent, the type or class of vehicle.

We believe that the antilock system of the present invention has particular utility for controlling pneumatically actuated brake systems. The delay times that are inherent in the mechanical structure of pneumatic systems place a particular burden on the control system to quickly and accurately compute an appropriate future response. The present system obtains the greater accuracy by employing digital logic and greater speed through particularly efficient processing methods discussed below in the signal processing section. Further, we have found that the control algorithm of the present invention is particularly well adapted to compensate for the mechanical delays present in a pneumatic brake system. Thus, a particularly efficient application of the present invention is to preventing wheel lock in a pneumatically actuated brake system, although it is to be understood that the present invention could be applied to other systems.

During the time that the value of the speed signal 100 is below the value of the reference signal during its second rate of decrement as shown along portion 105 of curve 102, the microprocessor continuously compares the relationship between the speed and reference signals while monitoring the time elapsed from point T2. Eventually, depending upon wheel loading and the frictional characteristics of the surface over which the wheel is moving, the wheel speed signal begins to increase upon the release of brake force under the control of the microprocessor until at time T3, the value of the speed signal once again corresponds with the value of the reference signal 102 and begins to go above the reference signal as shown at 106. In one embodiment of the present invention the release of the brake release signal occurs at the second time that the wheel speed signal crosses the reference velocity curve, whereas the reference speed signal does not resume its original relationship to the speed signal until a time after time T3 when the wheel speed signal reaches a value such that the value of the reference curve equals a predetermined fraction less than unity of the value of the speed signal, i.e. the microprocessor restores the original reference signal to the speed signal relationship that existed before time T1 so that the reference signal 102 again tracks the speed signal now depicted as section 106 of curve 100 at the previous fraction less than unity of the speed signal. In no event, however, does the speed signal go below the second minimum speed threshold 110 as indicated by point 10 in FIG. 3b.

Assuming that the braking force continues to exceed that which can be absorbed by the rotating wheel against the surface over which it is moving, the wheel speed signal again will begin to decrement at time T1' and the conditions that previously occurred at time T1 will again be detected by the microprocessor. The microprocessor will thereupon adjust the reference signal once again in a manner similar to that depicted at part 104 of curve 102 as the wheel speed signal continues to decay towards a lock-up condition. The entire process described above is therefore repeated until the wheel speed signal drops below a predetermined threshold, for example 10 ft/sec at which speed the controller is programmed to not turn on the solenoid.

In accordance with the present invention, the value of the reference signal 102 is normally maintained at 0.9 of the value of the speed signal 100 until the conditions at time T1, T1' . . . are detected. This relationship is shown in FIG. 3b to the left of time T1 and is show by curve 102a to the right of time T3 up to time T1'.

In accordance with the present invention, he microprocessor controller will not generate an antilock brake force release signal if the actual wheel speed drops below a first predetermined minimum threshold speed, for example 10 ft/sec. This avoids operation of the antilock system at low wheel velocity, which could increase the vehicle stopping distance. However, the microprocessor must not cancel the antilock brake release signal if the wheel speed signal drops below a second minimum threshold speed as a result of the brake applying excessive braking force to the wheel. Accordingly, the microprocessor controller does not cancel the brake release signal while the wheel speed signal 100 is below said second predetermined threshold indicative of an actual wheel speed less than the minimum threshold speed. The value of reference curve 102 is never less than a value corresponding to second threshold 110.

The control algorithm, in addition to inhibiting release of the solenoid valve when the wheel speed signal drops below minimum threshold 110, does not engage the solenoid valve unless the value of the wheel speed signal exceeds first minimum threshold 120. We have found through experimentation that the braking characteristics of a vehicle may vary greatly at slow vehicle velocities. The present system does not offer a substantial improvement over the results obtained by retaining control with the operator of the vehicle at vehicle velocities below approximately 10 ft/sec as represented by second threshold 120. The preferred embodiment of the present invention therefore does not attempt to regulate the application of braking force in these low velocity situations.

If the wheel speed signal drops below the minimum threshold velocity 110 during a brake controlled cycle, it is possible that, under certain conditions, the microprocessor may generate a brake force release signal when the wheel speed signal does not cross the reference signal 102 along part 105 of a plot of its value. The microprocessor might not adjust to the situation since it is waiting for the conditions at time T3 or T4 to occur, that is, a correspondence of the speed signal with the reference signal and a crossing over thereby so that the speed signal exceeds the reference signal. Maintenance of the brake force release signal under such conditions would be detrimental and could increase the stopping distance of the vehicle. Accordingly, the control system in accordance with the present invention includes a program within the microprocessor whereby, if the period of time P1 elapsed from time T2 exceeds a predetermined maximum elapsed time, the brake force release signal is cancelled to restore full brake control to the operator of the vehicle. For example, a maximum period of 2.5 seconds elapsed time has been found to be appropriate. If the software does not turn off the solenoid, however, the hardware will disable the entire antilock system after a longer elapsed time such as 4 seconds. The hardware failsafe is discussed in detail below in the failsafe circuit arrangement section.

LOW FRICTION MODIFICATION

The present invention permits the control algorithm to compensate for various road surface frictional characteristics as a function of the wheel speed signal 100 and, in particular, the time required for the actual rate of rotation of the wheel from which braking force has been released to increase its rate of rotation so that the wheel speed signal corresponds to the value of the reference signal along part 105 of curve 102. If the wheel is being braked on a low friction surface, a greater period of time is required for the wheel speed signal to correspond to reference signal 102 as the wheel speed signal increments along part 107 during the time elapsed from time T2. The microprocessor measures a time period P2 from the time when the wheel speed signal first decrements below a minimum threshold speed 40 at elapsed time T5 until the wheel speed signal corresponds with reference signal 102 at, for example, time T4. The control algorithm of the microprocessor accesses a value for a time constant K corresponding to the time required for the wheel speed signal to correspond to the value of reference curve 102 along curve 105. The value of K is an empirically derived experimental result. We have found that the value for K is related to the speed of the vehicle determined from the speed of the wheel at time T2 when the value of the wheel speed signal initially drops below the value of the reference signal 102. In accordance with this invention, the value of K depends on the initial wheel velocity at time T2 is as follows:

| Wheel Velocity | |
|---|---|
| (ft/sec) | K (sec) |
| >44 | 0.70 |
| 22 to 44 | 0.50 |
| <22 | 0.30 |

If time period P2 exceeds the applicable period of time K, the microprocessor detects a low friction/low load condition at the wheel and extends the brake release signal until expiration of time period P3. In the preferred embodiment P3 exceeds P2 by two times the amount that P2 exceeds K.

SYSTEMS AND CONTROL ALGORITHMS

Figure 4A:
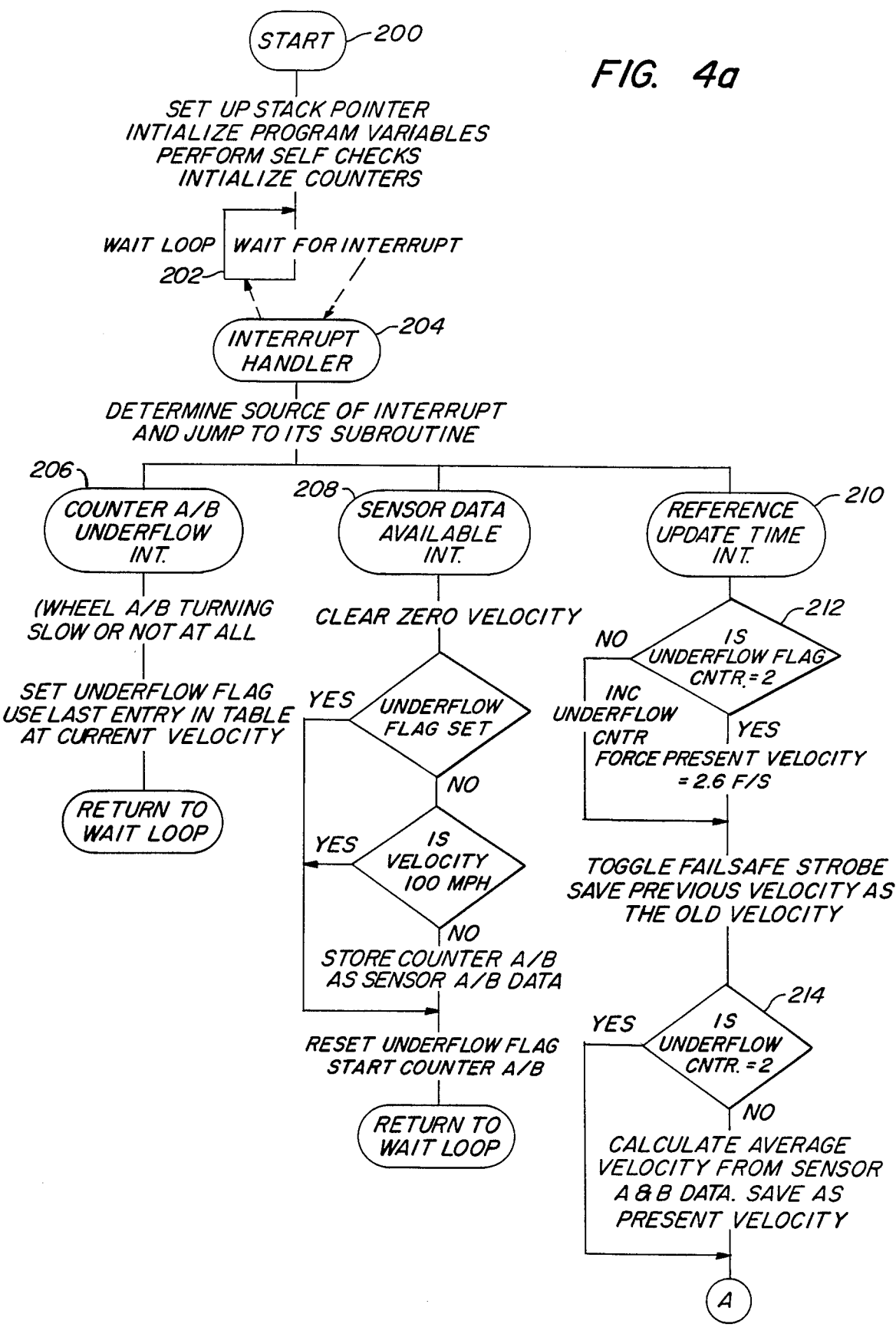
Figure 4B:
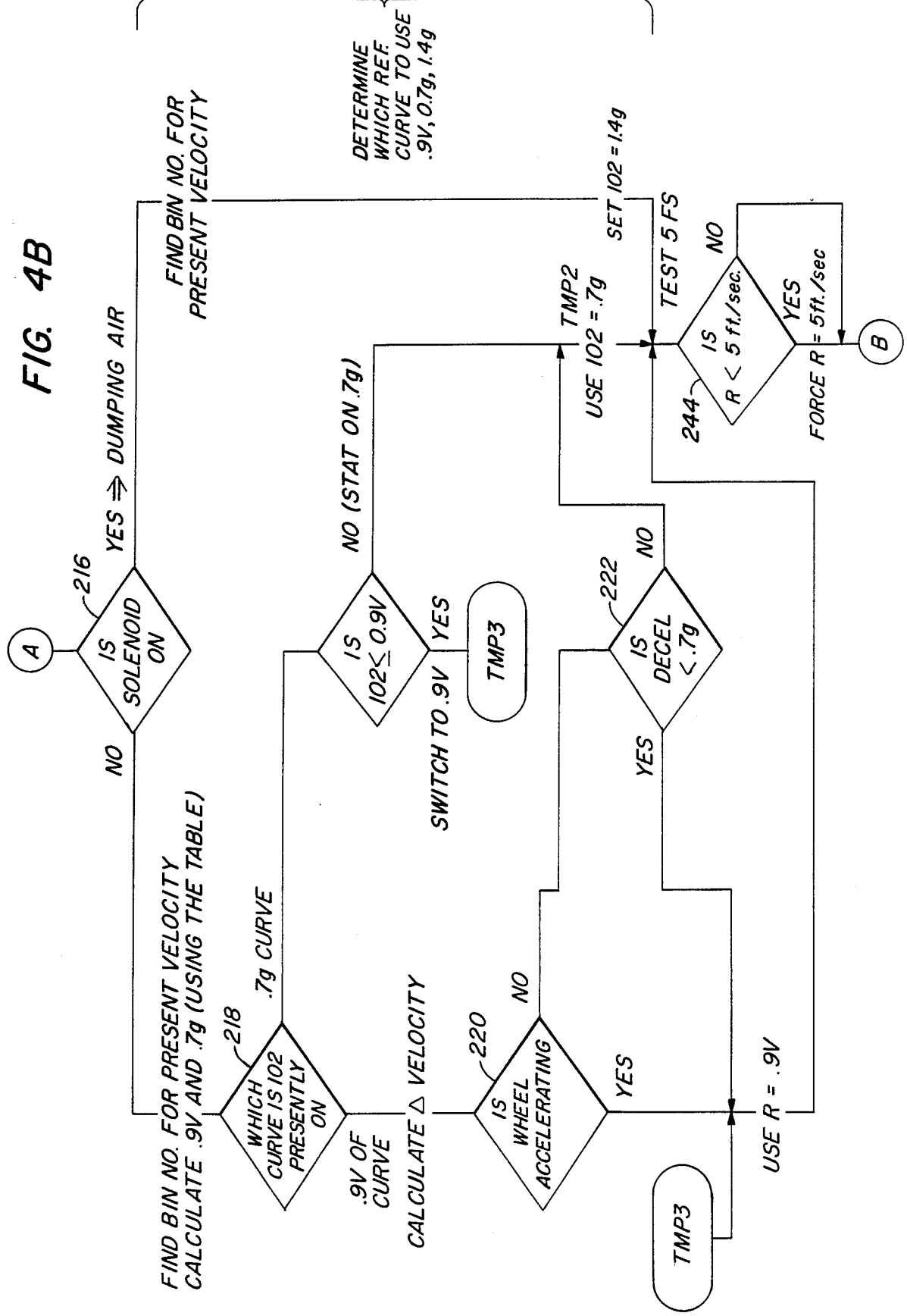

The foregoing general discussion may be further understood with reference to FIGS. 4a, 4b, and 4c showing flow charts of one software embodiment of the systems algorithms of the present invention. The systems algorithm begins when the system first receives power. The microprocessor controller 1 performs a series of self checks and initializes program variables and counters. The systems algorithm first determines the source of the interrupt. FIG. 4a shows, beginning at a point 200, the time the operator triggers the ignition of the vehicle. The controller performs an initialization routine and then puts the system algorithm into wait loop 202. The system algorithm exits the wait loop at periodic intervals corresponding to the reception of an interrupt signal at 204 and engages a control algorithm only upon the receipt of an interrupt signal which the controller generates in response to the falling edge of signals from the input sensor 3. If the braked wheels are rotating too slowly, the number of clock pulses generated during the period of time required for an input sensor pulse may exceed the ability of the microprocessor to count and produce an inaccurate measurement of the period of time required for the sensor pulse to arrive at the microprocessor. To prevent a too slow vehicle speed from generating inaccurate data to the microprocessor, the algorithm generates an underflow interrupt which indicates that the vehicle is travelling below a predetermined low speed, such as 3 mph. The controller generates underflow subroutine 206 in response to an underflow interrupt. The underflow routine initializes an underflow flag that signals the controller to store the last signal count as the value of the current wheel speed signal.

Independent of the speed at which the vehicle is traveling, the microprocessor generates a periodic interrupt, for example, every 10 mSec, corresponding to interrupt subroutine 204 of FIG. 4a. The systems algorithm contained in the microprocessor does not update the wheel speed signal used by the control algorithm until receipt of a sensor input pulse generated by the input speed sensor. Once the systems algorithm updates the wheel speed information, however, the control algorithm delays servicing the next sensor interrupt pulse, such as may be produced by the falling edge of wave packets 500 or 501 shown in FIG. 6(c). If the servicing of the updated value for the wheel speed signal were not delayed, the accuracy of the control algorithm could be compromised by a collision between simultaneous attempts of the systems algorithm to enter the updated wheel speed signal into its memory location and of the control algorithm to read that memory location. The present invention eliminates any possible collision by having the systems algorithm delay entering the new value for the wheel speed signal until the control algorithm has had sufficient time to complete its iteration.

Subroutine 210 implements the control program for the antilock system of the present invention. At 212 the program determines if the zero velocity counter has been on for two interrupt periods. If so, the value of the current velocity signal is arbitrarily set equal to a low, non-zero value such as 2.6 ft/sec to prevent the program from dividing by zero due to an uninitialized variable. Also, an underflow flag is set and the last valid value is maintained as the present value. The count immediately following an underflow count is also ignored because it is presumed that the following count is also part of the underflow condition. Otherwise, the controller stores the measured value from the single sensor as the speed value. An underflow condition means that the state of the brake release means is not changed by the control algorithm.

Referring to FIG. 4b, test 216 determines whether solenoid 7 is activated. If the solenoid is not on (i.e., the brake is applying force), the control system computes a wheel signal speed 100 corresponding to the sensed velocity of the wheel and reference signal 102 as described previously. After determining a bin number for the present velocity, the controller determines as follows whether reference curve 102 should correspond to 0.9 the value of curve 100 or if signal 102 should correspond to the first maximum rate of decrement corresponding with 0.7 g deceleration. Assuming initially that the reference signal corresponds to 0.9 of speed signal 100, the controller calculates the change in wheel velocity from the preceding iteration by subtracting the present value from the preceding value. The controller then tests at point 220 to determine whether the speed of the wheel is increasing. If so, the controller keeps the reference signal at the 0.9 value. However, if the speed of the wheel is decreasing, then the controller determines at 222 whether the reduction in speed corresponds to a deceleration of more than 0.7 g. If not, the program maintains the reference signal at 0.9 of the value of signal 100. If the deceleration is greater than 0.7 g, however, the program forces signal 102 to adopt a linear decrement value corresponding to a 0.7 g rate of deceleration.

The controller determines at 224 of FIG. 4b if the present value of reference signal 102 has dropped below the minimum threshold value 110 (e.g., 5 ft/sec). If so, the controller sets the value of reference signal 102 equal to a value corresponding to the minimum threshold velocity. If the value of curve 102 is above the threshold level, however, the value of the reference curve 102 is not changed.

At point 226 of FIG. 4c the controller again tests to determine whether the solenoid is activated (brake release signal generated). If not, the controller determines at point 228 whether the value of signal 100 exceeds the value of reference signal 102. If it does, the controller cuts off the brake release signal if it is not already off. If, however, the reference velocity signal 102 exceeds signal 100, the controller tests at 230 to determine whether the value of speed signal 100 corresponds to a velocity greater than a second minimum threshold velocity (e.g., 10 ft/sec). If the value of the wheel speed signal is less than the first threshold, the brake release signal is inhibited and full control of the brake is maintained by the operator of the vehicle.

If signal 102 is greater than signal 100 at test 228 and if at test 230 the value of signal 100 corresponds to a velocity greater than the second minimum threshold (10 ft/sec), the controller determines at 232 whether the solenoid turn on indicator has been commanded for at least two successive iterations of the control subroutine. If not, the routine returns to wait loop 202 without activating the solenoid.

Referring to FIG. 4b, if solenoid 5 is activated and releasing pressure from the brake, the program of the control subroutine branches from 216 directly to 224, and computes a reference signal to correspond to a second maximum linear deceleration rate of, for example, 1.0 g. The controller computes both the speed value and value for the reference signal by a bin look-up routine as previously described.

At point 226 of FIG. 4c the program branches to 234 and determines whether the solenoid signal has been on for a preset period, e.g., at least two seconds. If it has, the solenoid signal is turned off, reference signal 102 returns to a curve corresponding to 0.9 of the value of signal 100 and the program resumes wait loop 202. If the solenoid has not been on for two seconds, however, the program proceeds to 236 and determines whether the wheel is on a low traction surface (see the above discussion of the low friction modification). Assuming that the wheel is not, the program proceeds on to test 238 and determines whether the value of signal 100 corresponds with or crosses above reference velocity signal 102.

If the value of speed signal 100 goes above reference velocity signal 102, the controller assumes that the wheel is out of an incipient lock-up condition. The program tests at 240 to determine whether the time P2 that the solenoid signal has been on exceeds the period of the predetermined time constant K. If not, the controller turns off the solenoid signal and returns to the wait loop. If, however, the solenoid signal has been activated for longer than K seconds, the controller concludes that the wheel is operating on a low traction surface and increments a flag to delay up to time period P3 the generation of another solenoid release signal. The program then returns to the wait loop. If, however, the value of signal 100 remains below the reference signal 102 at 238, the controller jumps to 242 and increments a counter indicating the period of time P1 since signal 100 first crossed below reference signal 102 as well as a separate counter indicating the period of time P2 that the solenoid has been on after the speed signal reached threshold 120. Thus, during the next iteration, at point 236 the controller branches to point 244. If the value of signal 100 is above the reference signal 102, the solenoid is deactivated (brake restored). If, however, the value of signal 100 corresponds to a velocity below the first minimum threshold 120 at 246, the program increments counters from both time periods P1 and P2. The program then returns to wait loop 202. If, however, the value of signal 100 is above the value of threshold 110, the program increments only the counter for the period of time P1 that solenoid 7 has been actuated.

CONTROLLER METHOD AND APPARATUS

The controller of the present invention must operate in real time so that the program need not anticipate the change in the speed of the vehicle. The present invention responds to the speed of the vehicle as measured in the last one or two iterations or samples. The rapid rate at which the controller adjusts to changes in the speed of rotation of the wheel guarantees that the difference between the conditions on which the controller is acting and the instantaneous operating conditions of the vehicle does not adversely affect the ability of the system to control the vehicle. Moreover, the antilock system of the present invention may adjust to unexpected traction conditions because the controller responds to actual, possibly rapidly changing road conditions rather than anticipated conditions.

One method for he controller to perform computations would be to use signed, floating point double precision multiplication and division routines to compute a response for the antilock system during each iteration from a programed formula. This method produces results that are fully consistent with the present invention. However, executing a program each iteration of the antilock system is not the preferred embodiment of the present invention because, with present microprocessors, each iteration a control program requires too much time. Alternatively, additional processing hardware may be added to increase the processing speed or more powerful microprocessors can be used which is capable of completing the processing within an optimal period of time. We have found, however, that solutions for processing the algorithms of the present invention that require additional or more expensive hardware needlessly increase the cost of the antilock system without producing a corresponding benefit.

In a preferred embodiment of the present invention, both speed and reference signals are determined or computed with a bin look-up routine. Each input speed frequency signal has a corresponding velocity value stored in memory. The controller uses the number of the bin corresponding to the last recorded velocity as the present bin number to find the bin number corresponding to the most recent measured rotational speed. The look up routine reduces the time required for the controller to perform computations. It has been found that the computation routine can be performed quickly enough that the location of a subsequent bin is normally no more than two or three bins away from the location of the previous bin.

The present invention may be understood further with the aid of the following exemplary look-up table. The table has been prepared to illustrate the numerical relationship between each bin entry for a pneumatic brake system for a sensor that measures the passage of each of 29 teeth attached to an axle:

| BIN # | FT./SEC | PERIOD COUNT | −1.0 G REF. | .1 V | −.7 G |
|---|---|---|---|---|---|
| 0 | 88.0 | 981 | 4 | 109 | 3 |
| 1 | 87.3 | 989 | 4 | 110 | 3 |
| 2 | 86.6 | 997 | 4 | 111 | 3 |
| 3 | 85.9 | 1005 | 4 | 112 | 3 |
| 4 | 85.2 | 1013 | 4 | 113 | 3 |
| 5 | 84.5 | 1022 | 4 | 114 | 3 |
| 6 | 83.8 | 1030 | 4 | 114 | 3 |
| 7 | 83.1 | 1039 | 4 | 115 | 3 |
| 8 | 82.4 | 1048 | 4 | 116 | 3 |
| 9 | 81.7 | 1057 | 4 | 117 | 3 |
| 10 | 81.0 | 1066 | 4 | 118 | 3 |
| 11 | 80.3 | 1075 | 4 | 119 | 3 |
| 12 | 79.6 | 1085 | 4 | 121 | 3 |
| 13 | 78.9 | 1094 | 4 | 122 | 3 |
| 14 | 78.2 | 1104 | 5 | 123 | 3 |
| 15 | 77.5 | 1114 | 5 | 124 | 3 |
| 16 | 76.8 | 1124 | 5 | 125 | 3 |
| 17 | 76.1 | 1134 | 5 | 126 | 3 |
| 18 | 75.4 | 1145 | 5 | 127 | 3 |
| 19 | 74.7 | 1156 | 5 | 128 | 3 |
| 20 | 74.0 | 1167 | 5 | 130 | 4 |
| 21 | 73.3 | 1178 | 5 | 131 | 4 |
| 22 | 72.6 | 1189 | 5 | 132 | 4 |
| 23 | 71.9 | 1201 | 5 | 133 | 4 |
| 24 | 71.2 | 1213 | 5 | 135 | 4 |
| 25 | 70.5 | 1225 | 6 | 136 | 4 |
| 26 | 69.8 | 1237 | 6 | 137 | 4 |
| 27 | 69.1 | 1249 | 6 | 139 | 4 |
| 28 | 68.4 | 1262 | 6 | 140 | 4 |
| 29 | 67.7 | 1275 | 6 | 142 | 4 |
| 30 | 67.0 | 1289 | 6 | 143 | 4 |
| 31 | 66.3 | 1302 | 6 | 145 | 4 |
| 32 | 65.6 | 1316 | 6 | 146 | 5 |
| 33 | 64.9 | 1330 | 7 | 148 | 5 |
| 34 | 64.2 | 1345 | 7 | 149 | 5 |
| 35 | 63.5 | 1360 | 7 | 151 | 5 |
| 36 | 62.8 | 1375 | 7 | 153 | 5 |
| 37 | 62.1 | 1390 | 7 | 154 | 5 |
| 38 | 61.4 | 1406 | 7 | 156 | 5 |
| 39 | 60.7 | 1422 | 8 | 158 | 5 |
| 40 | 60.0 | 1439 | 8 | 160 | 5 |
| 41 | 59.3 | 1456 | 8 | 162 | 6 |
| 42 | 58.6 | 1473 | 8 | 164 | 6 |
| 43 | 57.9 | 1491 | 8 | 166 | 6 |
| 44 | 57.2 | 1509 | 8 | 168 | 6 |
| 45 | 56.5 | 1528 | 9 | 170 | 6 |
| 46 | 55.8 | 1547 | 9 | 172 | 6 |
| 47 | 55.1 | 1567 | 9 | 174 | 6 |
| 48 | 54.4 | 1587 | 9 | 176 | 7 |
| 49 | 53.7 | 1608 | 10 | 179 | 7 |
| 50 | 53.0 | 1629 | 10 | 181 | 7 |
| 51 | 52.3 | 1651 | 10 | 183 | 7 |
| 52 | 51.6 | 1673 | 10 | 186 | 7 |
| 53 | 50.9 | 1696 | 11 | 188 | 7 |
| 54 | 50.2 | 1720 | 11 | 191 | 8 |
| 55 | 49.5 | 1744 | 11 | 194 | 8 |
| 56 | 48.8 | 1769 | 12 | 197 | 8 |
| 57 | 48.1 | 1795 | 12 | 199 | 8 |
| 58 | 47.4 | 1821 | 12 | 202 | 9 |
| 59 | 46.7 | 1849 | 13 | 205 | 9 |
| 60 | 46.0 | 1877 | 13 | 209 | 9 |
| 61 | 45.3 | 1906 | 14 | 212 | 9 |
| 62 | 44.6 | 1936 | 14 | 215 | 10 |
| 63 | 43.9 | 1967 | 14 | 219 | 10 |
| 64 | 43.2 | 1999 | 15 | 222 | 10 |
| 65 | 42.5 | 2031 | 15 | 226 | 11 |
| 66 | 41.8 | 2065 | 16 | 229 | 11 |
| 67 | 41.1 | 2101 | 16 | 233 | 12 |
| 68 | 40.4 | 2137 | 17 | 237 | 12 |
| 69 | 39.7 | 2175 | 18 | 242 | 12 |
| 70 | 39.0 | 2214 | 18 | 246 | 13 |
| 71 | 38.3 | 2254 | 19 | 250 | 13 |
| 72 | 37.6 | 2296 | 20 | 255 | 14 |
| 73 | 36.9 | 2340 | 20 | 260 | 14 |
| 74 | 36.2 | 2385 | 21 | 265 | 15 |
| 75 | 35.5 | 2432 | 22 | 270 | 15 |
| 76 | 34.8 | 2481 | 23 | 276 | 16 |
| 77 | 34.1 | 2532 | 24 | 281 | 17 |
| 78 | 33.4 | 2585 | 25 | 287 | 17 |
| 79 | 32.7 | 2640 | 26 | 293 | 18 |
| 80 | 32.0 | 2698 | 27 | 300 | 19 |
| 81 | 31.3 | 2758 | 28 | 306 | 20 |
| 82 | 30.6 | 2821 | 30 | 313 | 21 |
| 83 | 29.9 | 2887 | 31 | 321 | 22 |
| 84 | 29.2 | 2957 | 33 | 329 | 23 |
| 85 | 28.5 | 3029 | 34 | 337 | 24 |
| 86 | 27.8 | 3106 | 36 | 345 | 25 |
| 87 | 27.1 | 3186 | 38 | 354 | 27 |
| 88 | 26.4 | 3270 | 40 | 363 | 28 |
| 89 | 25.7 | 3359 | 42 | 373 | 30 |
| 90 | 25.0 | 3453 | 45 | 384 | 31 |
| 91 | 24.3 | 3553 | 47 | 395 | 33 |
| 92 | 23.6 | 3658 | 50 | 406 | 35 |
| 93 | 22.9 | 3770 | 53 | 419 | 37 |
| 94 | 22.2 | 3889 | 57 | 432 | 40 |
| 95 | 21.5 | 40.6 | 61 | 446 | 42 |
| 96 | 20.8 | 4151 | 65 | 461 | 45 |
| 97 | 20.1 | 4295 | 69 | 477 | 48 |
| 98 | 19.4 | 4450 | 75 | 494 | 52 |
| 99 | 18.7 | 4617 | 80 | 513 | 56 |
| 100 | 18.0 | 4796 | 87 | 533 | 60 |
| 101 | 17.3 | 4990 | 94 | 554 | 65 |
| 102 | 16.6 | 5201 | 102 | 578 | 71 |
| 103 | 15.9 | 5430 | 112 | 603 | 78 |
| 104 | 15.2 | 5680 | 122 | 631 | 85 |
| 105 | 14.5 | 5954 | 134 | 662 | 93 |
| 106 | 13.8 | 6256 | 149 | 695 | 103 |
| 107 | 13.1 | 6590 | 165 | 432 | 115 |
| 108 | 12.4 | 6963 | 184 | 774 | 128 |
| 109 | 11.7 | 7379 | 207 | 820 | 144 |
| 110 | 11.0 | 7849 | 235 | 872 | 163 |
| 111 | 10.3 | 8382 | 269 | 931 | 186 |

-continued

| BIN # | FT./SEC | PERIOD COUNT | −1.0 G REF. | .1 V | −.7 G |
|---|---|---|---|---|---|
| 112 | 9.6 | 8993 | 310 | 999 | 215 |
| 113 | 8.9 | 9701 | 362 | 1078 | 250 |
| 114 | 8.2 | 10529 | 428 | 1170 | 296 |
| 115 | 7.5 | 11511 | 513 | 1279 | 354 |
| 116 | 6.8 | 12696 | 627 | 1411 | 432 |
| 117 | 6.1 | 14153 | 784 | 1573 | 540 |
| 118 | 5.4 | 15988 | 1007 | 1776 | 692 |
| 119 | 4.7 | 18369 | 1342 | 2041 | 919 |
| 120 | 4.0 | 21584 | 1877 | 2398 | 1280 |
| 121 | 3.0 | 26162 | 2809 | 2907 | 1905 |
| 122 | 2.6 | 33205 | 4660 | 3689 | 3130 |
| 123 | 1.9 | 45438 | 9202 | 5049 | 6073 |

It is to be understood that the numeric parameters for a given type of brake system and input sensor counting should work well for an entire class of vehicles having different wheel and axle size. The values for the table would change if, for example, the input sensor had a different number of teeth or if another type of brake system were use, for example a hydraulic brake system. The magnitude of changes between measurements, however, should remain in the approximate relationship illustrated in the above table.

The controller chosen to implement the program is preferably a conventional 8-bit microprocessor, such as a 6501Q made by Rockwell International's semiconductor group in Newport Beach California. The program is permanently stored in ROM memory or in external EPROM. In a preferred embodiment of the invention, the eight-bit NMOS microprocessor has 192 bytes internal RAM and 4K bytes of program memory in external EPROM. The microprocessor contains two internal programmable timer counters and up to 32 input/output ports as well as a programmable serial data port. The input wheel speed signal is connected to the PA0 port of the 6501Q and supplies the "count" window for the wheel speed signal which is found on the PA4 line. The details of the signal processing of the present invention are set forth in detail below in the signal processing section.

As exemplified above, the look-up table available to the microprocessor contains information on the braking characteristics of the vehicle. The look-up table is preferably a 128 by 4 table with each entry containing two bytes for a total of 1024 bytes in ROM. In the preferred embodiment a separate program generates binary values for the table. The program for computing the braking function requires accuracy of approximately 12 bits. Thus, an 8 bit microprocessor must make upper and lower byte comparisons to satisfy the precision requirement of the program.

SIGNAL PROCESSING

Referring again to FIG. 3(b), if the controller determines for two successive iterations that the solenoid should be activated (brake released), the controller generates a brake release signal to activate the solenoid and release brake force. After the solenoid is actuated, the controller determines the value for the speed of the wheel at the time that the value of speed signal 100 drops below signal 102 and calculates a value for time constant K that corresponds to the measured wheel speed signal as discussed above in the section on the low friction modification. The controller then returns the program to the wait loop 202 until the controller generates another interrupt signal.

It is significant to the present invention that brake force is not released on the first iteration of the control algorithm indicating that the wheel speed signal 100 has obtained correspondence with the reference velocity signal 102. We have found that transient, high frequency mechanical vibrations set an upper limit to the rate which the control algorithm may iterate. In the present invention, each iteration of the control algorithm normally requires a jump of no more than two or three bins for each measurement. One might expect that the control algorithm would jump fewer bins with a faster sampling rate. However, after doubling the rate of iteration of the control algorithm from 20 mSec. to 10 mSec., we discovered that the bins selected in succeeding iterations of the control algorithm often remained as widely separated as at the slower rate of iteration. This effect apparently results from transient, high frequency resonance vibrations in the carrier that distort the duration of the count window of the input wheel speed signal. The accuracy of the present invention may be particularly limited when the wheel speed sensor is placed near the wheel where it is subject to a broader frequency range of transient mechanical vibrations of greater amplitude.

We have found a particularly simple and effective method of processing the input wheel speed signal that prevents mechanical vibrations detected by the input wheel speed sensor from erroneously generating a brake force release signal. Specifically, the mechanical vibrations that are convolved with the input wheel speed signal (at least when the sensor is mounted on the carrier) generally are not so great as to distort the the value of the wheel speed signal below the value of the reference speed signal for more than one iteration of the control algorithm before the systems algorithm updates the wheel speed signal. Moreover, the mechanical vibrations generally are either so transient or so week that they do not distort the updated wheel speed sensor so as to again force the value of the wheel speed signal below the value of the reference speed signal on the very next iteration of the control algorithm. Thus, generating the brake force release signal after two successive iterations of the control algorithm indicates that the wheel speed signal is less than the reference velocity curve prevents the microprocessor from erroneously generating a brake force release signal in response to only mechanical vibrations of the sensor.

The effect of mechanical transients depends on the type of vehicle and the place on the vehicle where the sensor is mounted as these variables obviously effect the distribution of mechanical resonance frequencies at the sensor. The embodiment of the invention disclosed herein iterates the control algorithm approximately every 10 milliseconds; thus the delay in generating the brake force release signal is only 20 milliseconds. We believe that this delay time is very near the minimum possible even with the optimal positioning of the wheel speed sensor on the carrier of the vehicle. Indeed, we believe it may be best to increase the delay time to 30 or even back to 40 nSec. (corresponding to three or four iteration periods) to compensate for transient mechanical vibrations with particularly high amplitude generated, for example, when a truck cab or a tractor-trailer attempts to brake on a rough surface such as found on many city streets.

One may readily contemplate other methods for eliminating the adverse effect of the transient mechanical vibrations on the accuracy of the present invention. One method is to have a separate control algorithm determined the distance of one measurement from the previous measurement and discount the measurement if it required an excessive jump. However, the microprocessor controller of the present invention cannot process an additional special purpose control algorithm without sacrificing the processing speed of the control algorithm.

Figure 6:
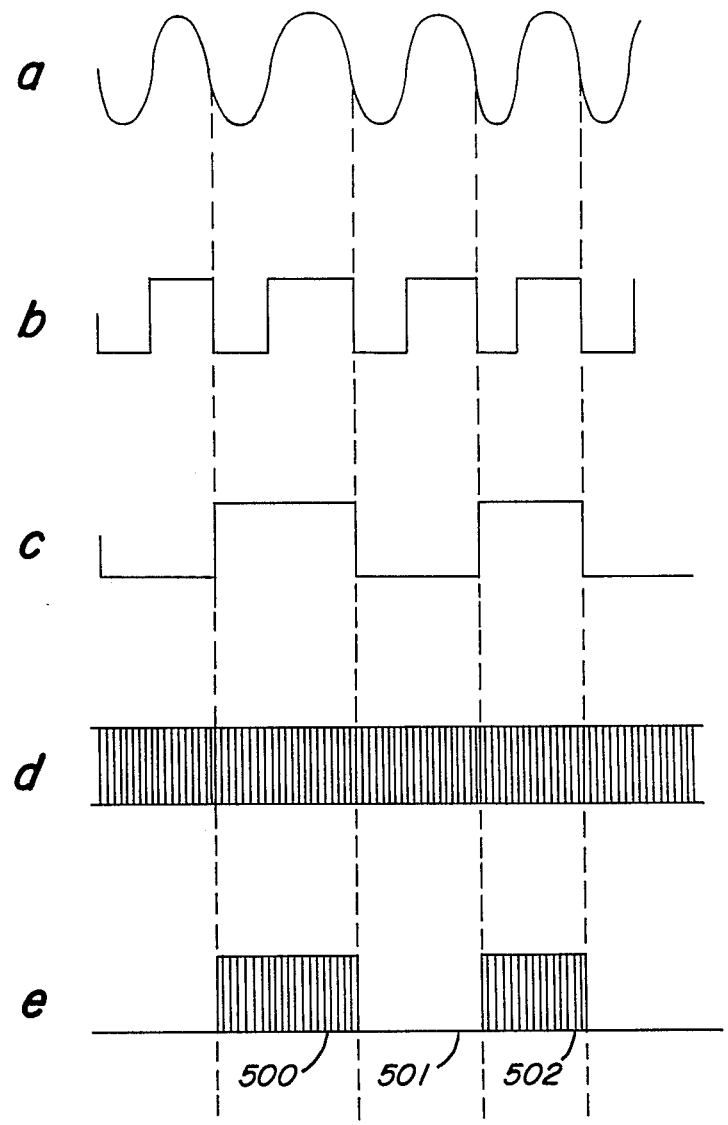
FIGS. 6 is a representation of the input signals a various points in the circuit shown in FIG. 5.

The signal processing carried out by the present invention may be better understood with reference to FIG. 6. FIG. 6a corresponds to the input signal generated by sensor 3. The wave form has been modified to emphasize the potentially asynchronous nature of the input signal caused by, for example, residual radial runout of the axle. FIG. 6b shows the signal after it has been squared by amplifier 13. The wave form shown in FIG. 6b is the wave form supplied to the clock terminal of flipflop 15. FIG. 6c shows the wave form produced by flipflop 15. Flipflop 15 effectively divides in half the period of the wave form supplied by sensor 3 so as to remove the potential asymmetries in the input wave form.

FIG. 6d is a schematic representation of the clock signal supplied by the microprocessor. The clock signal preferably has a substantially higher frequency than the sensor input signal so as to obtain a high resolution of the period of the input signal. In one embodiment of the present invention the microprocessor clock signal is on the order of approximately 1 MHz.

In the preferred embodiment of the present invention the digital logic, including systems and control algorithms, operate at the maximum computational rate of the microprocessor. Unlike other digitally controlled antilock systems that generate a separate lower frequency signal for the microprocessor to compare against the input wheel speed signal for force the control algorithm to operate at some multiple of the frequency of the input signal, the sampling rate of the present microprocessor corresponds to the full frequency of the clock of the microprocessor. It is to be appreciated that the elimination of binary "down counters" and digital counter circuits reduces the cost and complexity of the present invention in comparison to other antilock systems. Thus, the digital processing technique of the present invention minimizes the amount of hardware necessary to accurately time the digitalized input wheel speed signal.

Finally, FIG. 6e shows the output of flipflop 17. Wave packets 500 and 502 are discrete hardware gated clock pulses contained within the envelope of the signal from the speed sensor. The clock pulses have a frequency of, for example, 1 microsecond and the wave packets have a longer duration that varies in direct proportion to the period of the sensor signal and are, therefore, inversely proportional to, for example, the average speed of rotation of the of the wheels as measured by the wheel speed input sensor from the drive axle. The sensor pulses are presented to the counter of the microprocessor. A "dummy" wheel speed signal counter stores the count of the clock pulses contained in each wave packet. The microprocessor, however, executes the control algorithm during the arrival of the wave packets by using the value for the number of clock pulses contained in the preceding wave packet as the current wheel speed signal. The systems algorithm does not update the value of the wheel speed signal available to the microprocessor until after the interrupt generated by the falling edge of a wave packet 500, 502.

In between the time periods 500 and 502 when the microprocessor is receiving the wave forms from flipflop 17 is a period of "dead time" represented in FIG. 6e by 501. The "dead time" is important to the present invention in that it increases the accuracy and speed of control algorithm without requiring additional hardware. Under certain conditions the microprocessor might not complete processing the received data during the sensor period represented by 500 or 502. If so, the microprocessor must either not finish processing the given iteration or not accurately record the next sensor period by ignoring part of the next sensor pulse. Either result is highly undesirable because a collision between the systems algorithm attempting to update the wheel speed signal count at the same time that the control algorithm is reading the count could easily compromise the accuracy of the control algorithm.

We have found that a particularly economical method of processing the wheel speed input signal that permits rapid iteration of the control algorithm is to process only the sensor data from every other sensor period. The intervening dead time permits the microprocessor to process the control algorithm while updating the value of the wheel speed signal on a regular basis. Thus, the present invention eliminates the undesirable effects produced by the arrival of an input wheel speed sensor signal before the control algorithm had processed the preceding wheel speed input signal.

In addition to the advantages gained in faster and more accurate execution of the control algorithm, updating the wheel speed signal less frequently has other advantages that outweigh any apparent drawbacks. One might assume that selecting only every other sensor period, either with the sensor input circuit or by means of a command in the systems algorithm, decreases the response time of an antilock system. We have found, however, that this is not necessarily true. Under normal circumstances the actual speed of a vehicle does not change so quickly as to require that the control algorithm rapidly update the wheel speed signal, even when the control algorithm obtains wheel speed signal measurements as accurate as 2 parts in 500 as in the present invention. Indeed, as noted above, rapid variations in the input wheel speed signal normally result from extraneous effects transmitted by the input sensor rather than actual variations in the speed of the vehicle. Executing a control algorithm with the accuracy of the present invention in response to rapid variations in input wheel speed causes the control algorithm to "flutter", thus consuming much processing time without producing better antilock control than can be obtained with slower, less accurate control means. Rather than processing a rapidly updated wheel speed signal, we have found that an antilock system operates faster and better when the wheel speed signal is updated slowly and the control algorithm is executed rapidly because the antilock controller has more precise control over the brake force release means.

It is to be appreciated that a one could create an alternative method for processing wheel speed input signal as fast and as accurately as the preferred embodiment of the present invention that does not require a period of "dead time" in between processed pulses. For example, a second microprocessor could be used to store the sensor input signal into a temporary storage memory. The microprocessor performing the control algorithm could withdraw the last recorded value for input wheel speed signal from the temporary storage memory at appropriate intervals. Another alternative is to introduce some form of parallel signal processing to permit the control algorithm to begin processing one input signal before the processing of a prior signal has been completed. Alternative methods of signal processing, however, require additional hardware which increase the manufacturing costs of the antilock system and may not increase the accuracy of the antilock control because of the 'flutter' phenomenon. We prefer, however, to delay updating the wheel speed sensor signal by a period of time corresponding to one (or more) periods of the input wheel speed sensor signal because this method is faster in iterating the control algorithm, requires the least amount of hardware and software to implement and is, therefore, the most economical method for rapidly iterating the control algorithm.

INPUT CIRCUIT ARRANGEMENT

Figure 5:
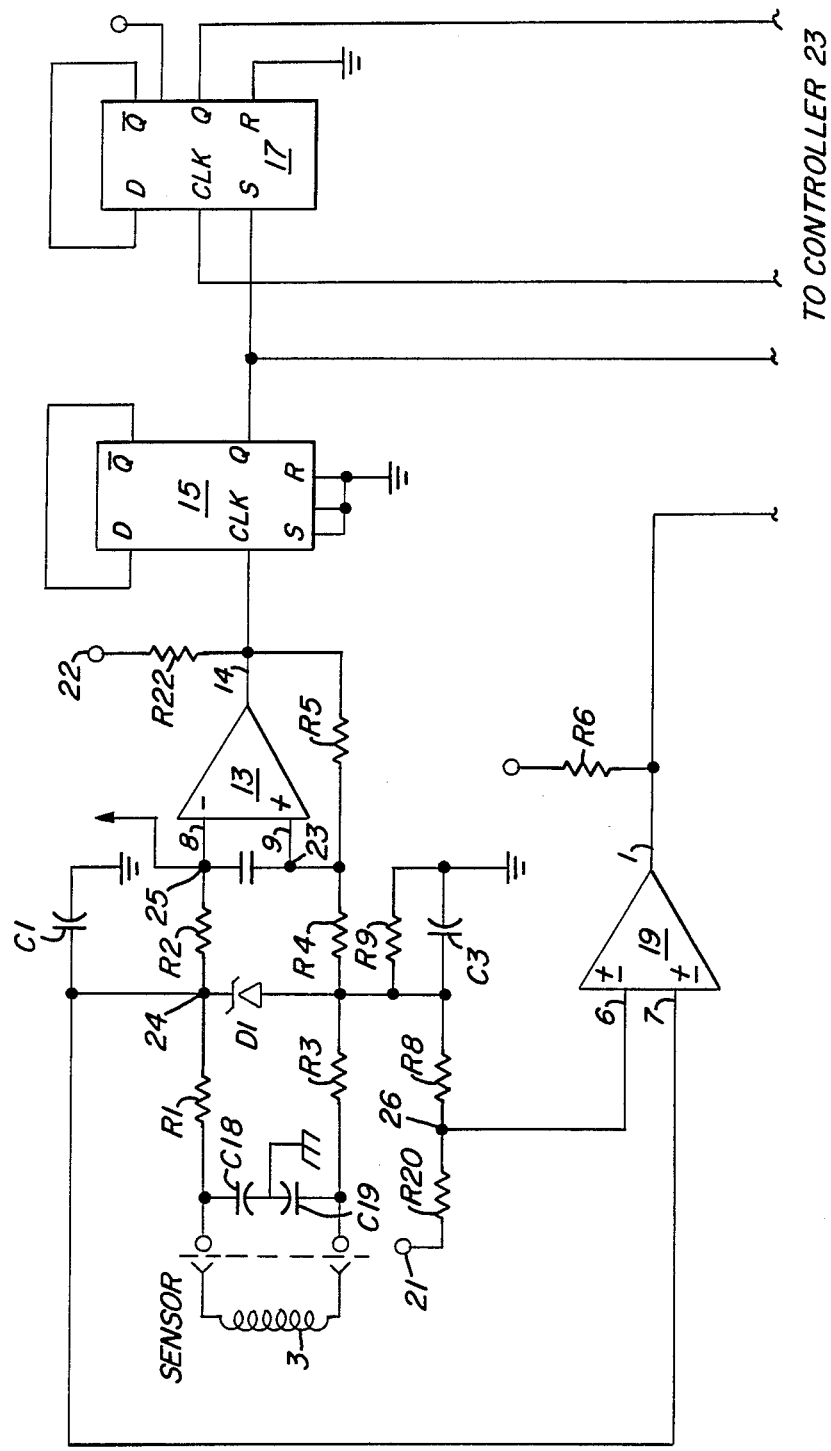
FIG. 5 is a diagram of the wheel speed sensing and digitizing circuit.

The input sensor circuit shown in FIG. 5 consists primarily of a conventional magnetic reluctance speed sensor 3, sensor amplifier 13, frequency divider flip-flop 15, count switching flip-flop 17, and a sensor feedback path through resistor R5. Referring to FIG. 5, the wheel speed sensor circuit is shown. A magnetic reluctance speed sensor 3 of conventional design well known in the art, and which cooperates with spaced magnetic teeth 5a on a rotary part rotating at a speed corresponding or proportional to actual rotational speed of the wheel. Sensor 3 is connected to amplifier 13 at points 23 and 25. Amplifier 13 has a high common mode rejection because each side of sensor 3 is biased by a common reference voltage, such as 2.5 volts. The bias voltage is supplied at points 25 and 23 and reduces the effect of stray voltage on the input sensor lines. Zener diode D1 limits the voltage range of the signal on the input lines, for example, to no more than 2.7 volts. The signal received by amplifier 13 must exceed a certain minimum voltage to change the output of the amplifier. The minimum voltage change is equal to the difference between the bias voltage and the hysteresis generated by the R5 feedback resistor. The minimum voltage change required to change the output of amplifier 13 is 0.5 volts.

Capacitor C18 forms a high pass filter for the sensor signal supplied to amplifier 13 by shunting the noise signal to ground so as to reduce high frequency interference. The roll off point of the filter is at approximately 10 kHz. Capacitors C1 and resistor R1 together with capacitor C3 and resistor R3 form a high pass filter to further protect the amplifier against radio frequency interference.

The output gain of amplifier 13 is sensitive only to hysteresis resistor R5. Therefore, resistors R1-R4 and R6, R8, R9 and R20 need not be precision resistors.

FAILSAFE CIRCUIT ARRANGEMENT

In the preferred embodiment of the present invention, microprocessor 23 checks the integrity of the sensor input circuit shown in FIG. 5 as follows. The microprocessor first determines whether sensor 3 forms a closed circuit. The circuit formed by the inductance coil and resistors R1 and R3 is not closed if, for example, the sensor is disconnected or if the inductance coil is broken. The microprocessor may also determine whether counting flip-flops 15 and 17 are operating correctly by sending the flip-flops a predetermined number of pulses and observing the number of counts which they record.

In the circuit shown in FIG. 5, microprocessor 23 achieves both results by raising test point 25 several times to a pull-up voltage of a predetermined high value. On the first pulse the operational amplifier 19 compares the voltage at point 24 with a reference voltage at point 26. The reference voltage is formed by a voltage divider consisting of resistors R8, and resistor R20 together with reference voltage applied at point 25. If sensor 3 does not form a closed circuit, the reference voltage at 26 is less than the voltage at point 25. The voltage at point 24, however, decreases if sensor 3 forms a closed circuit because the voltage from point 25 is divided by resistor R2 and resistors R1, R3 an R9. Thus, the voltage at point 24 is less than the reference voltage at point 26 if sensor 3 forms a closed circuit. Operational amplifier 19 measures the relative voltage values between points 25 and 26. The output of amplifier 19 indicates to the microprocessor whether the sensor is functioning properly. The microprocessor decides whether to enter into a failsafe mode based on the output signal from amplifier 19.

By strobing point 25 several times, such as eight, microprocessor 23 may also test to determine if the sensor amplifier 13 and flip-flops 15 and 17 are functioning correctly. The voltage supplied at point 23 is determined by the voltage divider formed by resistors R4, and resistor R2 together with hysteresis resistor R5. The pull-up voltage supplied to point 24 when sensor 3 forms a closed circuit has a greater value than the voltage supplied to point 23. If this condition is met, raising the voltage at point 25 changes the output of sensor amplifier 13 and causes flip-flops 15 and 17 to register the change as if it were produced by sensor 3. Microprocessor 23 determines the number of counts received by the flip-flops during the test sequence as if the pulses came from the sensor.

Microprocessor 23 tests the sensor 3 on only the first pulse. After the last pulse, the microprocessor checks the count switching flip-flop 17 for the proper number of recorded pulses. If the count is not correct, either the amplifier 13 is not receiving the clock pulses or the flip-flops are clocking incorrectly. In either instance, microprocessor 23 generates a failsafe diagnostic code that returns control of the brake to the operator of the vehicle and enables failsafe indictor lamp 9. In contrast, if the failsafe check indicates that the sensor, sensor amplifier and flip-flops are functioning correctly, microprocessor 23 disables the strobing function for point 25 so that the strobing function does not interfere with the signals from sensor 3.

The frequency at which microprocessor 23 pulses point 25 is a function of the time required for the various circuit components to respond. The present invention requires only that the pulse remain at a high value for a sufficient period of time that the microprocessor may make accurate measurements.

The last test that the controller performs on the sensor input circuit is to determine if sensor 3 is shorted. A shorted sensor cannot produce a signal to sensor amplifier 13 and, therefore, produces a situation identical to where the wheel of the vehicle never begins to move. As noted above, the control algorithm of the present invention does not release pressure from the brake unless the speed of the wheel exceeds the predetermined minimum threshold. Therefore, a short in the speed sensor automatically disables the antilock system.

To alert the operator of the vehicle that a problem exists with the antilock system, the controller enables the failsafe lamp 9 until sensor data becomes available and the underflow flag is reset. The operator of the vehicle is presumed to know that the failsafe lamp does not extinguish until the vehicle reaches a certain minimum speed such as at least three miles an hour. The operator is also presumed to know that the antilock system is defective if it does not extinguish the failsafe lamp when the vehicle is moving at a greater speed.

Figure 7:
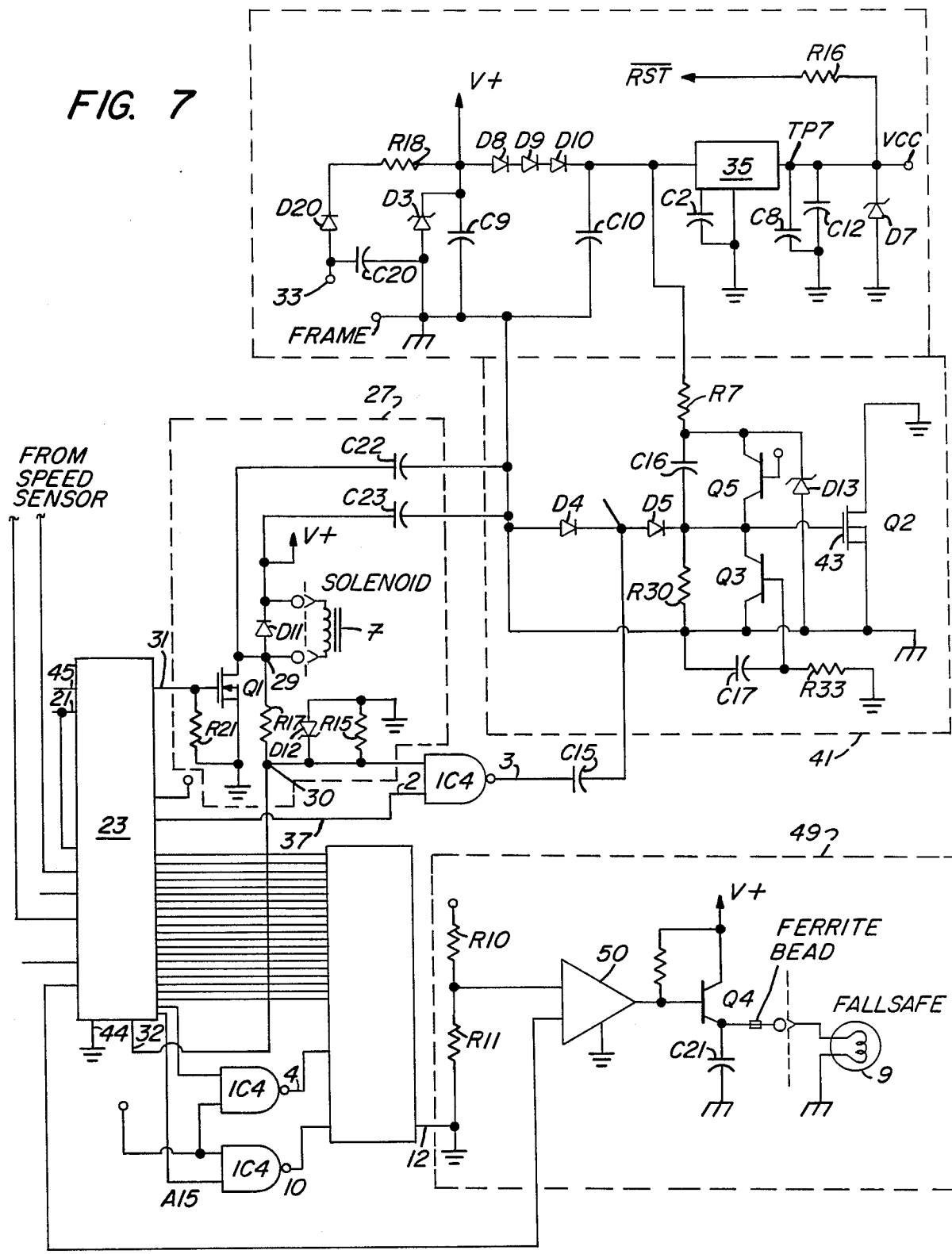
FIG. 7 is a circuit diagram illustrating the circuit utilized to generate the brake force release signal in accordance with this invention and for detecting and indicating a failure in the electrical system used to generate and control the brake release signal.

Another component of the antilock system according to the present invention is input power regulator circuit 31 shown in FIG. 7. The circuit contains a voltage regulator unit 35 which is specifically designed for use in automotive systems. A regulator of this type typically has internal protection against transient voltages, load dump protection, thermal shutdown capability, short circuit protection, wide ranging temperature compensation and an internal power-up reset. The regulator should turn off the microprocessor if the input voltage exceeds the maximum permissible voltage or if the load exceeds 1% of the regulated value. In one embodiment of the present invention, a L487 power regulator manufactured by the SGS Corporation of Italy is used.

The regulator circuit receives power through input power line 33 and diode D20 directly from the ignition of the vehicle. Diode D20 serves to protect the regulator circuit from possible voltage reversals of the input power line. In the preferred embodiment of the present invention, the input power is fed through a one-half ohm resistor R18. Resistor R18, a large value capacitor C20 and a transient absorbing Zener diode D3, smooth out high voltage spikes on the input line and protect MOSFETs Q1 and Q2 from a short circuit that may draw an excessive amount of power. A large value capacitor C12 at the end of the power supply prevents the regulator from ringing. Also, Zener diode D7 serves to eliminate any transient current that may get past the transorb D3 and regulator 35.

Circuit 35 uses voltage dropping diodes D8–D10 to lessen heat dissipation. The regulator 35 typically has a two-to-one difference in current draw between high and low temperature states. Using a fixed resistor to give a satisfactory voltage drop at high temperatures produces an excessive voltage drop at low temperatures. In contrast, the diode arrangement of FIG. 6 provides a constant voltage drop over the full temperature range.

Without a heat sink, regulator 35 can go into thermal shutdown. To avoid a thermally induced failure, a metal heat sink conducts excess thermal energy from regulator 35 to power MOSFET Q2. The MOSFET has a positive temperature coefficient, i.e., the conductance of the MOSFET decreases with increasing temperature. Thus, the thermal energy from regulator 35 increases the resistance of MOSFET Q2 and decreases the power drawn by the regulator circuit 35. The MOSFET reduces the heat dissipated by the regulator and prevents thermal shutdown by reducing the amount of power supplied to the system as set forth below.

In addition to the checks of the sensor input circuit of FIG. 6, microprocessor 23 determines whether solenoid feedback circuit 27 of FIG. 7 is functioning correctly. Microprocessor 23 tests solenoid 7 by briefly activating solenoid 5. The microprocessor pulses the gate of solenoid control MOSFET Q1 for a brief period of time, such as 100 microseconds. If the solenoid is functioning correctly, side 29 of solenoid 7 floats high when MOSFET Q1 is turned off because the solenoid is a d.c. open circuit that connects point 29 directly to the voltage source V+ (note that V+ of circuit 27 corresponds to V+ of circuit 31). Likewise, when MOSFET Q1 conducts, side 29 briefly connects directly to frame ground because the solenoid is an a.c. open circuit. If the solenoid is not functioning correctly, however, the voltage at point 29 must assume a different value than just described. For example, if solenoid 7 is not connected or if the induction coil is broken, side 29 cannot contact voltage source V+ and, therefore, cannot obtain a high voltage value. Likewise, MOSFET Q1 cannot ground side 29 if solenoid 7 is shorted because the solenoid is no longer an a.c. open circuit and MOSFET Q1 cannot ground the entire electrical system of the vehicle for even a brief period of time. Therefore, microprocessor 26 can sense the voltage at side 29 and determine whether the sensor is operational. If the value of the voltage received is not correct, microprocessor 23 originates a diagnostic code that disables the antilock system and returns the brake to the control of the operator.

The microprocessor also enables failsafe indicator lamp 9 to inform the operator of the vehicle of a problem with the unit.

The power MOSFET Q2 controls the power to the entire antilock system by acting as a power switch between the frame ground of the vehicle and a power ground. Gate 43 of MOSFET Q2 receives no voltage during quiescent operation of the system because capacitor C16 insulates the gate of Q2 from the fixed voltage output of regulator circuit 35. When the vehicle ignition system is triggered, however, the output of regulator circuit 35 increases the voltage across capacitor C16 and, therefore, also increases the voltage of the gate of MOSFET Q2 causing the MOSFET to turn on and supply power to the entire system.

Capacitor C16 must have a sufficient capacitance to turn on MOSFET Q2 during a slow voltage increase commonly referred to as cold cranking. During low voltage start-ups, however, power MOSFET Q2 can be turned on directly by the power regulator 35 and transistor Q5. The base of transistor Q5 receives reference voltage from regulator 35 which increases as the regulator receives power. Once the base to emitter voltage of transistor Q5 is sufficiently great, Q5 temporarily connects the gate of Q2 directly to the input power regulator 35. The base to emitter voltage of Q2 thus is enhanced more than enough to initially turn on the power MOSFET.

A failsafe circuit controls the voltage to the gate, and hence the conductive state, of MOSFET Q2. Periodically, such as every 10 milliseconds, microprocessor 23 sends failsafe pulses to the gate of power MOSFET Q2 along line 37. The value of capacitor C16 must be sufficiently small and the value of resistor R30 sufficiently great that the failsafe pulses maintain MOSFET Q2 in a conductive state. The failsafe pulses from microprocessor 23 are the only means by which MOSFET Q2 remains in conduction during normal operation.

The failsafe signal transmitted along line 37 is NANDed with low side 29 of solenoid 7 through NAND gate 39. Thus, gate 39 terminates the failsafe signal whenever the solenoid is activated because, as explained above, point 29 is grounded whenever solenoid 5 is activated. The loss of the failsafe signal eventually reduces the voltage at the gate of MOSFET Q2 and cuts off power to the entire system. The RC time constant of capacitor C16 and resistor R30 determines the time required for the gate voltage to fall below the necessary enhancement level. The preferred embodiment of the present invention requires the failsafe signals not be received for four seconds to turn off Q2.

The failsafe signal at the output of NAND gate 39 is a.c. coupled through capacitor C15 to watchdog timer circuit 41. The a.c. coupling enables the failsafe port on microprocessor 35 to assume an intermediate value during a system failure without turning on Q2. Diodes D4 and D5 rectify the signal from the microprocessor. Diode D4 completely discharges capacitor C15 so that the maximum current passes through diode D5 during the charge cycle.

A failsafe condition results whenever MOSFET Q2 turns off. The MOSFET Q2 is the only connection between the power ground and the frame ground. If MOSFET Q2 becomes nonconductive, the power ground increases in voltage to the value of the input voltage. Transistor Q3 detects any difference in voltage between the power ground and frame ground. If the voltage value of the power ground rises above the base to emitter turn on voltage for transistor Q3, the transistor turns on and connects the gate of power MOSFET directly to frame ground. Transistor Q3 thus permanently disables MOSFET Q2 and prevents a reset pulse from strobing microprocessor 23 to reinitialize the systems algorithm. Capacitor C17 slightly delays turning on transistor Q3 during ignition.

As noted, if the system is thrown into failsafe for any reason, the power to microprocessor 23 is turned off and the failsafe light 9 is lit. The failsafe indicator lamp 9 receives power directly from a power transistor Q4 which is connected to the ignition of the vehicle through V+. The transistor must be connected to sense a change in voltage of the power ground. Thus, when the power ground floats high during a failsafe condition, the difference in voltage between frame ground and power ground turns on transistor Q4. Circuit 49 of FIG. 8 obtains this result by connecting the base of transistor Q4 to frame ground through operational amplifier 50. The base of Q4 is connected to power ground so long as the output of amplifier 50 is low. The voltage to turn on transistor Q4, however, comes directly from the ignition of the vehicle through resistor R12 so that the failsafe lamp is enabled even if the microprocessor is not.

In the preferred embodiment of the present invention, microprocessor 23 may enable the failsafe lamp both indirectly by turning off the power MOSFET Q2 as well as directly by supplying a sufficiently positive voltage to operational amplifier 50. Amplifier 50 compares the signal from microprocessor 23 against a reference voltage that is halfway between the reference voltage of the system and power ground. If microprocessor 23 puts out a high signal, the amplifier 50 turns on transistor Q4. Conversely, the microprocessor can keep the failsafe lamp disabled by not sending out a high signal to amplifier 50.

CONCLUSION

The principles, preferred embodiment and modes of operation of the present invention have been described in the foregoing specification. The invention which is intended to be protected herein should not, however, be construed as limited to the particular forms described, as these are to be regarded as illustrative rather than restrictive. Variations and changes may be made by those skilled in the art without departing from the spirit of the invention. Accordingly, the foregoing detailed description should be considered exemplary in nature and not limiting to the scope and spirit of the invention set forth in the appended claims.

We claim:

1. In an antilock mechanism for a vehicle having an input rotatable drive shaft which is mounted in a carrier housing for rotating at least one wheel mounted thereon, said vehicle and axle being subject to mechanical vibrations from said wheel, a sensor for measuring a quantity indicative of the rate of rotation of said wheel and generating an input signal, said sensor being subject to mechanical vibrations or electromagnetic interference or environmental interference, and a microprocessor for receiving said input signal, processing said signal and generating an input signal, said sensor being subject to mechanical vibrations or electromagnetic interference or environmental interference, and a microprocessor for receiving said input signal, processing said signal and generating a brake force release signal to release a brake, the improvement comprising:

- a shielded metal housing for said sensor and microprocessor;
- means for mounting said sensor on said carrier housing in said shielded metal housing at a location next to said drive shaft at a location remote from said wheel;
- means for mounting said microprocessor adjacent to said sensor in said shielded metal housing on said carrier housing; and
- said input drive shaft for the wheel having spaced magnetic elements for cooperation with said wheel speed sensor.

2. An antilock system as claimed in claim 1, further comprising: at least two wheel driven by said drive axle so that said antilock mechanism measures an average speed of the wheels.

3. An antilock mechanism as claimed in claim 2, wherein the processing includes said microprocessor iterating a control algorithm in less than 10 milliseconds.

4. An antilock mechanism as claimed in claim 3, further comprising means for delaying the brake force release signal for at least one additional iteration of the control algorithm after the control algorithm first indicates that the brake should be released.

5. An antilock mechanism as claimed in claim 2, wherein said sensor and said microprocessor are integral with said carrier housing.

6. An antilock mechanism as claimed in claim 1, wherein the antilock mechanism is a speed logic system.

7. A sensor input circuit for an antilock brake mechanism mounted on a drive axle housing of a vehicle at a location remote from the wheel of the vehicle to supply to a controller means a signal indicative of a speed of rotation of a wheel of a vehicle and to control actuation of a brake release means, comprising:

- a shielded metal housing mounted on said drive axle housing;
- controller means comprising a microprocessor within said shielded metal housing;
- wheel speed sensor means within said shielded metal housing for producing an input wheel speed signal indicative of the speed of rotation of the wheel, said sensor including means for forming an operational circuit including said sensor when said sensor is operative;
- said drive axle having magnetic elements cooperating with said sensor;
- input signal amplifier means having signal receiving means connected to receive the wheel speed signal from said wheel speed sensor means and output means to produce an amplifier output signal in response to the wheel speed signal, said signal having at least two distinct values;
- counting means connected to receive the amplifier output signal to produce a digital count signal indicative of a number of times that the output signal changes value, said count signal constituting a digital value related to the number of times the output signal changes between distinct values;
- means connecting the digital count signal from the counting means to the controller means;
- said controller including means to apply a first test voltage pulse to the signal receiving means of the input amplifier at a first test point positioned near the signal receiving means so that the test pulse changes the output signal;
- means for comparing the test voltage pulse at said signal receiving means against a reference voltage having a voltage value between a first voltage value that the first test point assumes when the sensor forms an operational circuit and a second voltage value that the receiving means assumes when the sensor does not form an operational circuit;
- voltage comparator means to produce a comparison signal, said comparison signal assuming a first indicative state when the sensor forms an operational circuit and a second indicative state when the sensor does not form an operational circuit;
- said controller including means to apply a predetermined number of additional test voltage pulses to the first test point of the input amplifier means so that the total number of pulses supplied to the first test point changes the output signal of the input amplifier by a predetermined count;
- means to measure the digital output of the counting means and to compare the digital output of the counting means with a predetermined result; and
- disabling means to disable the entire antilock mechanism if the comparison signal indicates that the sensor does not form an operational circuit or if the digital output of the counting means differs from the predetermined result.

8. A circuit arrangement for controlling the supply of power to the circuit of claim 7 an antilock brake mechanism designed to generate a signal to release braking force from a brake, including

- power regulator means to supply power to the system, said power regulator means connected to supply a voltage potential between a power terminal and a frame ground;
- power transistor means connected between the power ground and the frame ground to carry current from the power terminal to the frame ground, said power transistor having gate means to control the ability of the transistor to enter a conductive state;
- initialization means located between the regulator means and the gate of the transistor means to isolate the gate from the output power of the regulator means during steady operation, said initialization means also acting to connect the output of the regulator means to the gate of the transistor when the power supplied by the regulator means increases as during system power-up;
- pulse generating means to supply failsafe pulses to the gate of the transistor, said pulses being the only means to bring the power transistor into the conductive state during steady operation of the power regulator, said pulse generating means receiving power only from the power transistor;

storage means to average the pulses so that the transistor does not turn off in between failsafe pulses;

decay means for removing the failsafe pulses from the storage means so as to turn off the transistor after a predetermined period of time if the supply of pulses from the pulse generating means is deactivated for a length of time equal to a predetermined cutoff time.

9. The circuit arrangement of claim 8, wherein the pulse generator is controlled by interrupts supplied by a microprocessor.

10. The circuit arrangement of claim 2, including a locking transistor responsive to a voltage difference between the power terminal and the frame ground, the locking transistor connected to pass current between the gate of the power transistor and the frame ground so as to ground the gate of the power transistor and thus permanently disable the entire antilock system if a conductive voltage difference appears between the gate of the power transistor and the power terminal indicating that the power transistor is not receiving failsafe pulses from the pulse generator.

11. The circuit arrangement as claimed in claim 7, including a power-up transistor connected to respond to a difference in voltage between the output of the power regulator means and a power-up reference voltage that occurs when the power is first supplied to the power regulator means, said power-up transistor connecting the gate of the power transistor to the output of the power regulator means so as to turn on the power transistor and supply power to the entire antilock system.

12. The circuit arrangement as claimed in claim 11, including heat sink means connecting the power regulator means and the power transistor.

13. A failsafe circuit for the antilock brake mechanism of claim 7, comprising:
a solenoid valve to release braking force from a brake, said solenoid having first and second sides;
a voltage source connected to the first side of the solenoid valve;
a power switch connected to a second side of said solenoid valve, said power switch connecting said second side to ground when closed;
means for opening the power switch for a predetermined period of time; and
means for measuring the voltage of the second side both when the power switch connects the second side to ground and when the power switch does not connect the power switch to ground.

14. The failsafe circuit as claimed in claim 13, further including means for generating a failsafe signal unless the voltage on the second side corresponds to ground when the power switch is open and corresponds to a value other than ground when the power switch is closed.

15. The failsafe circuit as claimed in claim 13, further comprising:
means for indicating a failure of the solenoid valve to an operator of the vehicle, said means for indicating being activated by the failsafe signal.

16. The failsafe circuit as claimed in claim 15 wherein the power switch is a transistor;
the voltage source is the electrical system of the vehicle; and
the means for opening the power switch and the means for measuring the voltage of the second side is a microprocessor;

17. The failsafe circuit as claimed in claim 16, wherein the predetermined period of time is less than 20 milliseconds.

18. In an antilock brake control mechanism for large tractor-trailer rigs and similar trucks having an input drive shaft, a carrier housing for said drive shaft, pneumatically actuated brakes for the wheels and a speed sensor which is adapted to sense the average rate of rotation of two wheels of the vehicle and to release the brake forces by an electric signal to said wheels in response to a decrease in the wheel speed, that improvement comprising:
an electrically actuated brake force releasing device in the form of a solenoid to relieve fluid brake pressure to the brake in response to a detected wheel lock-up condition;
a speed sensor located on said input drive shaft, said sensor providing a digital wheel speed signal having a value corresponding to the average speed of rotation of one wheel of the vehicle;
a microprocessor adjacent said speed sensor generating a brake force release signal for said brake at a first time when the digital value of said wheel speed signal substantially corresponds to or drops below the digital value of said reference speed signal;
the carrier housing for said drive shaft providing a shielded metal enclosure enclosing said speed sensor and said microprocessor from environmental hazards and road shock occurring at the wheel and also protecting against radio frequency interference;
said speed sensor providing an average wheel speed signal to the microprocessor immediately adjacent;
said microprocessor producing a reference speed signal from the wheel speed signal by iterating a control algorithm, said reference speed signal having a digital value that corresponds to a fraction less than unity of the digital value of said wheel speed signal until said wheel speed signal decrements faster than a first rate of speed decrement, said reference speed signal thereafter decrementing at the first rate until the digital value of said wheel speed signal by the fraction less than unity;
said microprocessor also terminating said brake force release signal at an end time when the digital value of said wheel speed signal substantially corresponds to or becomes greater than the digital value of said reference speed signal;
means for releasing a brake in response to said brake force release signal; and
a brake for the wheel whose speed of rotation is being sensed.

19. An antilock brake control mechanism as claimed in claim 18, wherein said reference speed control signal is produced by said microprocessor by iterating the control algorithm in less than 10 milliseconds.

20. An antilock brake control mechanism as claimed in claim 19, wherein said microprocessor is provided with means for delaying the brake force release signal for at least one additional iteration of the control algorithm after the control algorithm first indicates that the brake should be released.

21. An antilock brake control mechanism as claimed in claim 18, wherein said microprocessor includes means for delaying the generating of said brake force release signal after said first time for at least one iteration of the control algorithm if, and only if, the digital value of said wheel speed signal continues to correspond to or drop below the digital value of said reference speed during subsequent iterations of said control algorithm and wherein said iteration of the control algorithm is iterated in a period of time less than 20 milliseconds.

22. An antilock brake control mechanism as claimed in claim 21 wherein said microprocessor includes means for producing a wheel speed input signal having a first frequency proportional to the actual speed of rotation of one wheel of the vehicle, means for generating a clock signal having a second frequency greater than said first frequency and which is constant and means for producing a count signal having wave packets of the clock signal so that each wave packet has an edge separated from a leading edge and separated from a period of dead time corresponding to the duration of the wave packet and means for counting the clock signal in each wave packet.

23. An antilock brake control mechanism as claimed in claim 22 further including means for generating an updated interrupt signal at the end of each wave packet and means for updating the digital value of the wheel speed signal in response to the updated interrupted signal.

24. An antilock brake control mechanism as claimed in claim 18 wherein said reference speed signal decreases to a vehicle deceleration corresponding to 1.0 and the pre-determined time period constant which is set forth below is related to the initial speed as follows:

| Wheel Speed Signal | Predetermined Time Constant |
| --- | --- |
| >44 ft/sec | 0.70 sec |
| from 22 to 44 ft/sec | 0.50 sec |
| <22 ft/sec | 0.30 sec |

* * * * *